United States Patent
Hatsuda et al.

(10) Patent No.: US 12,469,158 B2
(45) Date of Patent: Nov. 11, 2025

(54) MEASUREMENT DEVICE AND MEASUREMENT METHOD

(71) Applicant: Panasonic Intellectual Property Management Co., Ltd., Osaka (JP)

(72) Inventors: Ken Hatsuda, Kyoto (JP); Masamitsu Murase, Kyoto (JP); Riku Matsumoto, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 291 days.

(21) Appl. No.: 18/372,068

(22) Filed: Sep. 23, 2023

(65) Prior Publication Data

US 2024/0013422 A1 Jan. 11, 2024

Related U.S. Application Data

(63) Continuation of application No. PCT/JP2022/010325, filed on Mar. 9, 2022.

(30) Foreign Application Priority Data

Mar. 31, 2021 (JP) .................................. 2021-061255

(51) Int. Cl.
*G06K 9/00* (2022.01)
*G06T 7/11* (2017.01)
(Continued)

(52) U.S. Cl.
CPC .................. *G06T 7/60* (2013.01); *G06T 7/11* (2017.01); *G06T 7/70* (2017.01); *G06T 2207/20081* (2013.01); *G06T 2207/20084* (2013.01)

(58) Field of Classification Search
CPC . G06T 2207/20081; G06T 2207/20084; G06T 7/11; G06T 7/60; G06T 7/70; G01B 11/02
See application file for complete search history.

(56) References Cited

U.S. PATENT DOCUMENTS

| | | | |
|---|---|---|---|
| 10,559,086 B1* | 2/2020 | Miller | H04N 23/45 |
| 2009/0244551 A1* | 10/2009 | Lutz | B65G 65/005 |
| | | | 356/630 |

(Continued)

FOREIGN PATENT DOCUMENTS

| | | | |
|---|---|---|---|
| JP | H09-257414 A | 10/1997 | |
| JP | H10-030917 A | 2/1998 | |

(Continued)

OTHER PUBLICATIONS

International Search Report for related Application No. PCT/JP2022/010325, mailed May 31, 2022.

*Primary Examiner* — Hadi Akhavannik
(74) *Attorney, Agent, or Firm* — Renner, Otto, Boisselle & Sklar, LLP

(57) ABSTRACT

A measurement device includes: an imager that captures a target including a pallet and a load, the pallet including a reference target; an image processing unit that extracts a specific region in each of the reference target and a region of the load based on image data of the target; and a calculator that acquires first coordinate information indicating 3D coordinates associated with the image data of the target and standard load form structure information indicating a structural dimension of a standard load form of the pallet associated with coordinates of the specific region, and calculates protruding lengths of the load protruding from the pallet. The image processing unit extracts the specific region by inputting the image data of the target into a first machine learning model subjected to training by using, as training data, image data of the pallet and data indicating the specific region.

19 Claims, 20 Drawing Sheets

(51) Int. Cl.
    *G06T 7/60*           (2017.01)
    *G06T 7/70*           (2017.01)

(56) References Cited

U.S. PATENT DOCUMENTS

| | | | | |
|---|---|---|---|---|
| 2017/0336195 | A1* | 11/2017 | Suzuki | G01B 11/00 |
| 2018/0089517 | A1* | 3/2018 | Douglas | G06V 20/56 |
| 2020/0302207 | A1* | 9/2020 | Perkins | G06T 7/13 |
| 2020/0319648 | A1* | 10/2020 | Eckman | G01C 21/206 |
| 2020/0334899 | A1* | 10/2020 | Mello | G06T 7/75 |
| 2021/0133666 | A1* | 5/2021 | Eckman | G06T 7/62 |
| 2021/0207943 | A1* | 7/2021 | Fujiwara | G06T 7/62 |

FOREIGN PATENT DOCUMENTS

| | | |
|---|---|---|
| JP | 2013-217671 A | 10/2013 |
| WO | 2016/199366 A1 | 12/2016 |
| WO | 2020/066847 A1 | 4/2020 |

\* cited by examiner

FIG. 3
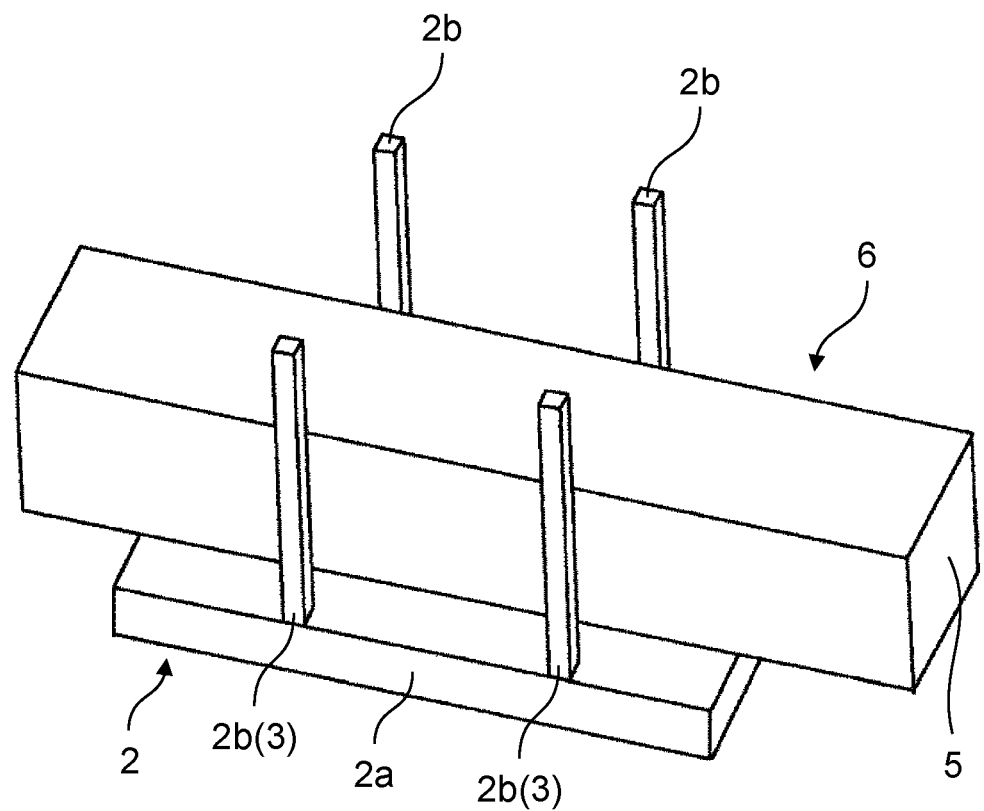
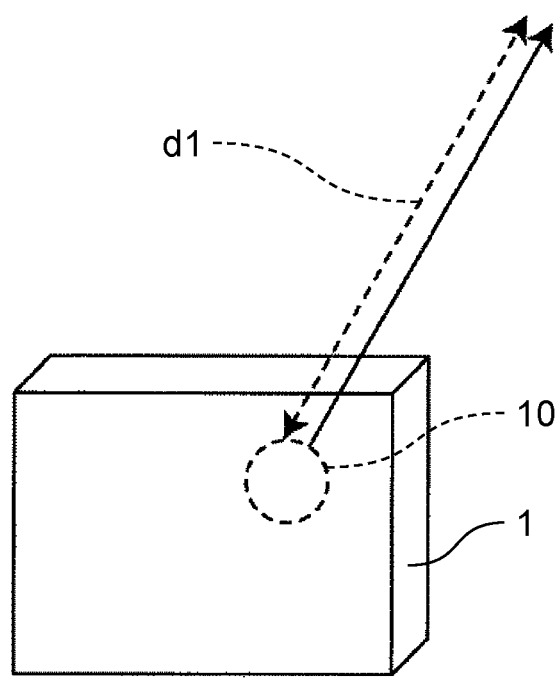

FIG. 4
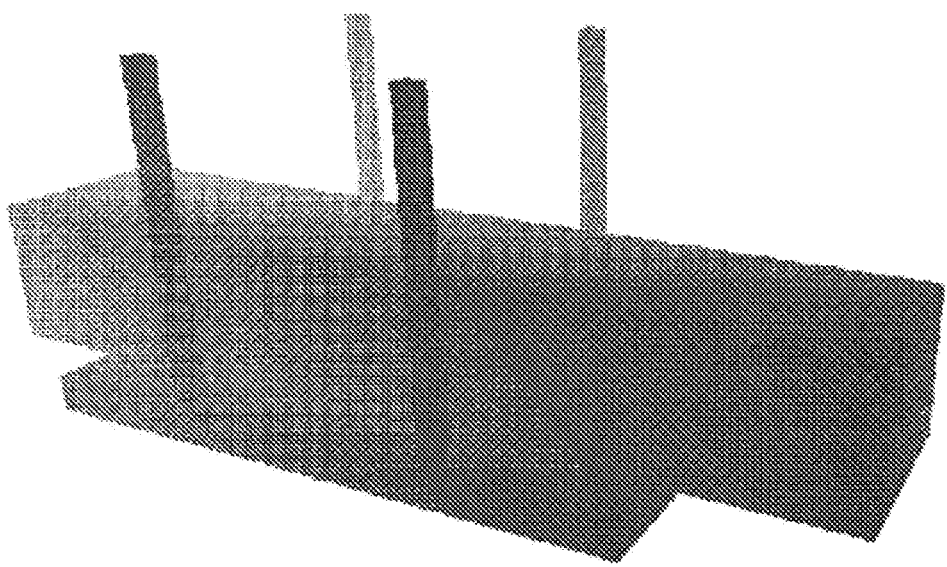
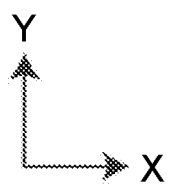

FIG. 8
INPUT DATA
(IMAGE DATA)
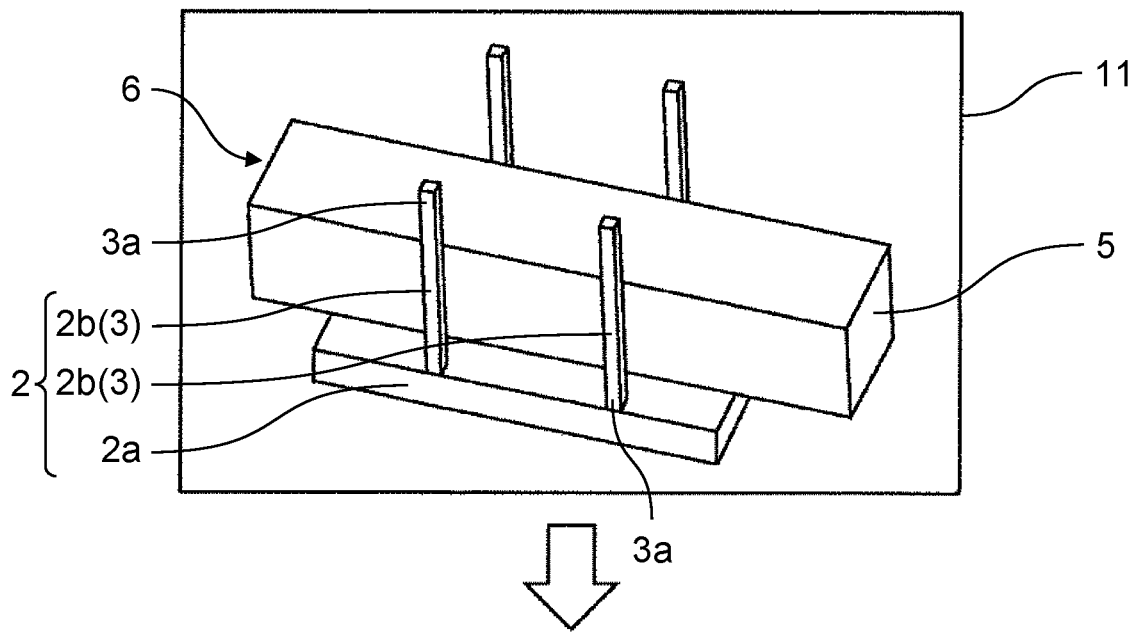
SECOND MACHINE LEARNING MODEL — 22
OUTPUT DATA
(OBTAINED BY EXTRACTING REGION R2 OF LOAD)
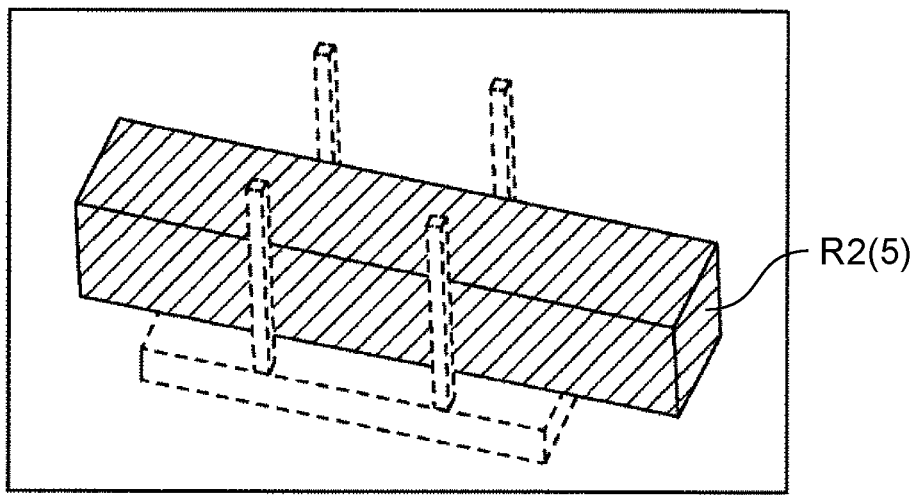

MEASUREMENT DEVICE AND MEASUREMENT METHOD

BACKGROUND

1. Technical Field

The present disclosure relates to a measurement device and a measurement method.

2. Description of the Related Art

Patent Literature (PTL) 1 discloses a device that detects a position and a form of a three-dimensional object.

The device described in PTL 1 captures an image of a planar target by one camera under three types of light sources of red, green, and blue, and detects a three-dimensional position and a form of the target from the image.

PTL 1 is Unexamined Japanese Patent Publication No. 2013-217671.

SUMMARY

In recent years, it has been required to measure protruding lengths of a load protruding from a pallet.

Therefore, an object of the present disclosure is to solve problems described before, and to provide a measurement device and a measurement method capable of measuring the protruding lengths of the load placed on the pallet.

A measurement device of one aspect of the present disclosure includes:
an imager that captures a target including a pallet and a load, the pallet including a reference target;
an image processing unit that extracts a specific region in the reference target and a region of the load based on image data of the target captured by the imager; and
a calculator that acquires first coordinate information indicating 3D coordinates associated with the image data and standard load form structure information indicating a structural dimension of a standard load form of the pallet associated with coordinates of the specific region, and calculates protruding lengths of the load protruding from the pallet based on the specific region, the region of the load, the first coordinate information, and the standard load form structure information,
in which
the image processing unit acquires output data obtained by inputting, as input data, the image data of the target captured by the imager to a first machine learning model subjected to training by using, as training data, image data of the pallet having the reference target and data indicating the specific regions in the reference target, to extract the specific region in the reference target.

A measurement method of one aspect of the present disclosure includes:
capturing a target including a pallet and a load, the pallet including a reference target;
extracting a specific region in the reference target based on image data of the target captured;
extracting a region of the load based on the image data of the target captured;
acquiring first coordinate information indicating 3D coordinates associated with the image data and standard load form structure information indicating a structural dimension of a standard load form of the pallet associated with coordinates of the specific region; and
calculating protruding lengths of the load protruding from the pallet based on the specific region, the region of the load, the first coordinate information, and the standard load form structure information,
in which
extracting the specific region in the reference target includes acquiring output data obtained by inputting, as input data, the image data of the target captured to a first machine learning model subjected to training by using, as training data, image data of the pallet having the reference target and data indicating the specific region in the reference target, to extract the specific region in the reference target.

These general and specific aspects may be implemented by a system, a method, a computer program, a computer-readable recording medium, and a combination thereof.

According to the present disclosure, it is possible to provide the measurement device and the measurement method capable of measuring the protruding lengths of the load protruding from the pallet.

BRIEF DESCRIPTION OF THE DRAWINGS

FIG. 3 is a schematic diagram illustrating an example of capturing of a target including the pallet and a load by the measurement device.

FIG. 4 is a schematic diagram illustrating an example of 3D coordinate information acquired by the measurement device.

FIG. 8 is a schematic diagram illustrating an example of processes of the image processing unit by using a second machine learning model.

DETAILED DESCRIPTION

Background the Present Disclosure

Figure 1:
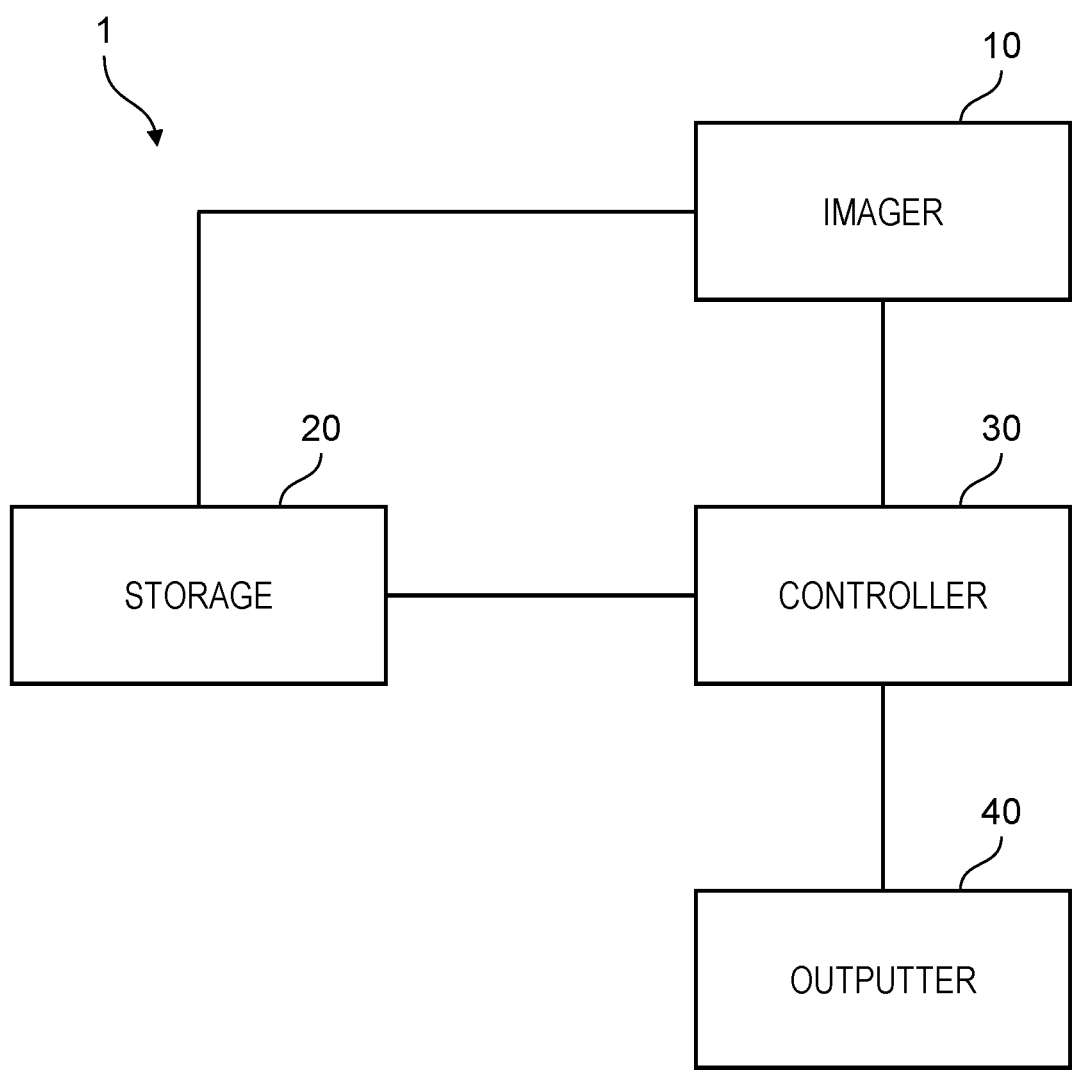
FIG. 1 is a schematic block diagram illustrating an example of a configuration of a measurement device of a first exemplary embodiment according to the present disclosure.

A pallet is used as a platform for placing a load thereon in, for example, logistics. At this time, for example, a plurality of pallets can be stacked side by side in a horizontal direction and a vertical direction by using a post pallet having struts, aligning horizontal positions of the struts for the pallets to stack the pallets overlapped in the vertical direction. Accordingly, the pallets are efficiently arranged in a limited space such as a truck or a warehouse.

Here, in a case where dimensions of a rectangular parallelepiped surrounding an outer shape of a target post pallet are set as standard load form dimensions, and the pallet is stacked side by side in the horizontal direction and the vertical direction at appropriate intervals for the standard load form dimensions, the pallet having a long load exceeding the standard load form dimensions placed thereon beyond the standard load form dimensions cannot be arranged adjacent to the pallet due to interference of the load, and stacking efficiency decreases.

Further, since it is necessary to align the horizontal positions of the struts on the post pallets to be stacked on upper and lower sides, a range of the interference of the load protruding from the standard load form dimensions differs depending on a placement position of the load on the pallet, even when entire widths of the pallet and the load are the same. In order to enhance reception efficiency and transportation efficiency of such pallet, for example, it is necessary to measure the protruding lengths of the load for each specific orientation such as a right side, and a device capable of easily measuring the protruding lengths has been required.

Therefore, in order to solve problems described before, the present inventors have found a configuration for easily measuring the protruding lengths of the load by capturing the target including the pallet having the reference targets and the load, and have reached the present disclosure below.

A measurement device according to a first aspect of the present disclosure includes: an imager that captures a target including a pallet and a load, the pallet including a reference target; an image processing unit that extracts a specific region in the reference target and a region of the load based on image data of the target captured by the imager; and a calculator that acquires first coordinate information indicating 3D coordinates associated with the image data and standard load form structure information indicating a structural dimension of a standard load form of the pallet associated with coordinates of the specific region, and calculates protruding lengths of the load protruding from the pallet based on the specific region, the region of the load, the first coordinate information, and the standard load form structure information, in which the image processing unit acquires output data obtained by inputting, as input data, the image data of the target captured by the imager to a first machine learning model subjected to training by using, as training data, image data of the pallet having the reference target and data indicating the specific region in the reference target, to extract the specific region in the reference target.

In a measurement device of a second aspect of the present disclosure, the reference target may has a plurality of vertexes defining the specific region, and the first machine learning model may detect the plurality of vertexes in the image data.

In a measurement device of a third aspect of the present disclosure, the first machine learning model may be Key Point Detection using Mask R-CNN.

In a measurement device of a fourth aspect of the present disclosure, the reference target may have at least one reference plane, and the image processing unit may extract the specific region based on the at least one reference plane.

In a measurement device of a fifth aspect of the present disclosure, the at least one reference plane may be a plurality of reference planes, and the plurality of reference planes may be arranged apart from each other on a same plane.

In a measurement device of a sixth aspect of the present disclosure, the pallet may include a bottom plate and a plurality of struts disposed on the bottom plate, and the reference target may be at least one strut among the plurality of struts.

In a measurement device of a seventh aspect of the present disclosure, the plurality of struts may be arranged along an outer edge of the bottom plate, the at least one strut may have a plane as a reference plane on an outer edge side of the bottom plate, and the image processing unit may extract the specific regions based on the plane.

In a measurement device of an eighth aspect of the present disclosure, the image processing unit may acquire output data obtained by inputting, as the input data, the image data of the target to a second machine learning model subjected to training by using, as training data, image data of the load placed on the pallet and data indicating the region of the load, to extract the region of the load.

In a measurement device of a ninth aspect of the present disclosure, the second machine learning model may be Instance Segmentation using a Mask R-CNN model.

In a measurement device of a tenth aspect of the present disclosure, the imager may acquire the image data of the target and the first coordinate information by capturing the target.

In a measurement device of an eleventh aspect of the present disclosure, the calculator may acquire second coordinate information indicating 3D coordinates of the specific regions based on the specific region and the first coordinate information, acquire third coordinate information indicating 3D coordinates of the standard load form to be defined by the specific regions based on the second coordinate information and the standard load form structure information, acquire fourth coordinate information indicating 3D coordinates of the region of the load based on the region of the load and the first coordinate information, and calculate the protruding lengths of the load based on the third coordinate information and the fourth coordinate information.

In a measurement device of a twelfth aspect of the present disclosure, the calculator may acquire the third coordinate information including at least a plane equation for a protruding plane as a reference for protruding of the load in the standard load form, and calculate the protruding lengths of the load based on the plane equation for the protruding plane and the fourth coordinate information.

In a measurement device of a thirteenth aspect of the present disclosure, the calculator may calculate a plane equation for a first plane of the standard load form on a side where the reference targets including the specific regions are arranged based on the second coordinate information, calculate a plurality of reference points in the specific regions and a vector to be calculated from the plurality of reference points based on the second coordinate information, and calculate the plane equation for the protruding plane based on the plane equation for the first plane, at least one reference point among the plurality of reference points, the vector, and the standard load form structure information.

In a measurement device according to a fourteenth aspect of the present disclosure, the calculator may acquire the third coordinate information including 3D coordinates of two planes facing each other in the standard load form, calculate a region sandwiched between the two planes from the 3D coordinates of the two planes, and calculate the protruding lengths of the load in the region sandwiched between the two planes.

In a measurement device of a fifteenth aspect of the present disclosure, the calculator may process, as the region of the load, a region where the load is continuously present from a region of the standard load form in the load that is protruding from the pallet.

In a measurement device of to a sixteenth aspect of the present disclosure, the calculator may calculate a maximum protruding length among the protruding lengths of the load.

A measurement device of a seventeenth aspect of the present disclosure may further include an outputter that outputs the protruding lengths.

A measurement method of an eighteenth aspect of the present disclosure includes: capturing a target including a pallet and a load, the pallet including a reference target; extracting a specific region in each of the reference target based on image data of the target captured; extracting a region of the load based on the image data of the target captured; acquiring first coordinate information indicating 3D coordinates associated with the image data and standard load form structure information indicating a structural dimension of a standard load form of the pallet associated with coordinates of the specific region; and calculating protruding lengths of the load protruding from the pallet based on the specific region, the region of the load, the first coordinate information, and the standard load form structure information, in which extracting the specific region in the reference target includes acquiring output data obtained by inputting, as input data, the image data of the target captured to a first machine learning model subjected to training by using, as training data, image data of the pallet having the reference target and data indicating the specific region in the reference target, to extract the specific region in the reference target.

A program of a nineteenth aspect of the present disclosure causes a computer to execute the measurement method of the aspect described before.

Hereinafter, one exemplary embodiment of the present disclosure will be described with reference to accompanying drawings. Note that, the following description is merely exemplary in nature, and is not intended to limit the present disclosure, applications, or uses thereof. Moreover, the drawings are each schematic, and for example, ratios of respective dimensions do not necessarily equal to an actual dimension.

First Exemplary Embodiment

[Overall configuration] FIG. 1 is a schematic block diagram illustrating an example of a configuration of measurement device 1 of the first exemplary embodiment according to the present disclosure. As illustrated in FIG. 1, measurement device 1 includes imager 10, storage 20, controller 30, and outputter 40. For example, measurement device 1 is a tablet computer. Note that, in the first exemplary embodiment, an example where measurement device 1 includes outputter 40 will be described, but outputter 40 is not an essential configuration.

<Imager>

Imager 10 acquires image data of a target being an object and 3D coordinate information associated with the image data by capturing the object. The image data is data of a color image. The 3D coordinate information associated with the image data refers to information of 3D coordinates corresponding to a respective pixel of the image data. In the present description, "the 3D coordinate information associated with the image data" may be referred to as the "first coordinate information".

Imager 10 is, for example, a depth camera. The depth camera measures a distance to a target to generate depth information indicating the distance measured as a depth value for each pixel. For example, the depth camera may be an infrared active stereo camera, or a LiDAR depth camera. Note that, imager 10 is not limited to these depth cameras.

<Storage>

Storage 20 is a storage medium that stores programs and data necessary to implement functions of measurement device 1. For example, storage 20 can be implemented by, for example, a hard disk (HDD), a solid state drive (SSD), a random access memory (RAM), a dynamic RAM (DRAM), a ferroelectric memory, a flash memory, a magnetic disk, or a combination thereof.

<Controller>

Controller 30 can be implemented by, for example, a semiconductor device. For example, controller 30 can include a microcomputer, a central processing unit (CPU), a micro processing unit (MPU), a graphics processing unit (GPU), a digital signal processor (DSP), a field programmable gate array (FPGA), or an application specific integrated circuit (ASIC). Functions of controller 30 may be implemented only by hardware, or may be implemented by a combination of the hardware and software.

Controller 30 implements predetermined functions by reading out data and programs stored in storage 20 to perform various arithmetic processing.

<Outputter>

Outputter 40 has a display that displays arithmetic processing results of controller 30. For example, the display may include a liquid crystal display or an organic EL display. Further, outputter 40 may include, for example, a speaker that emits sound.

Figure 2:
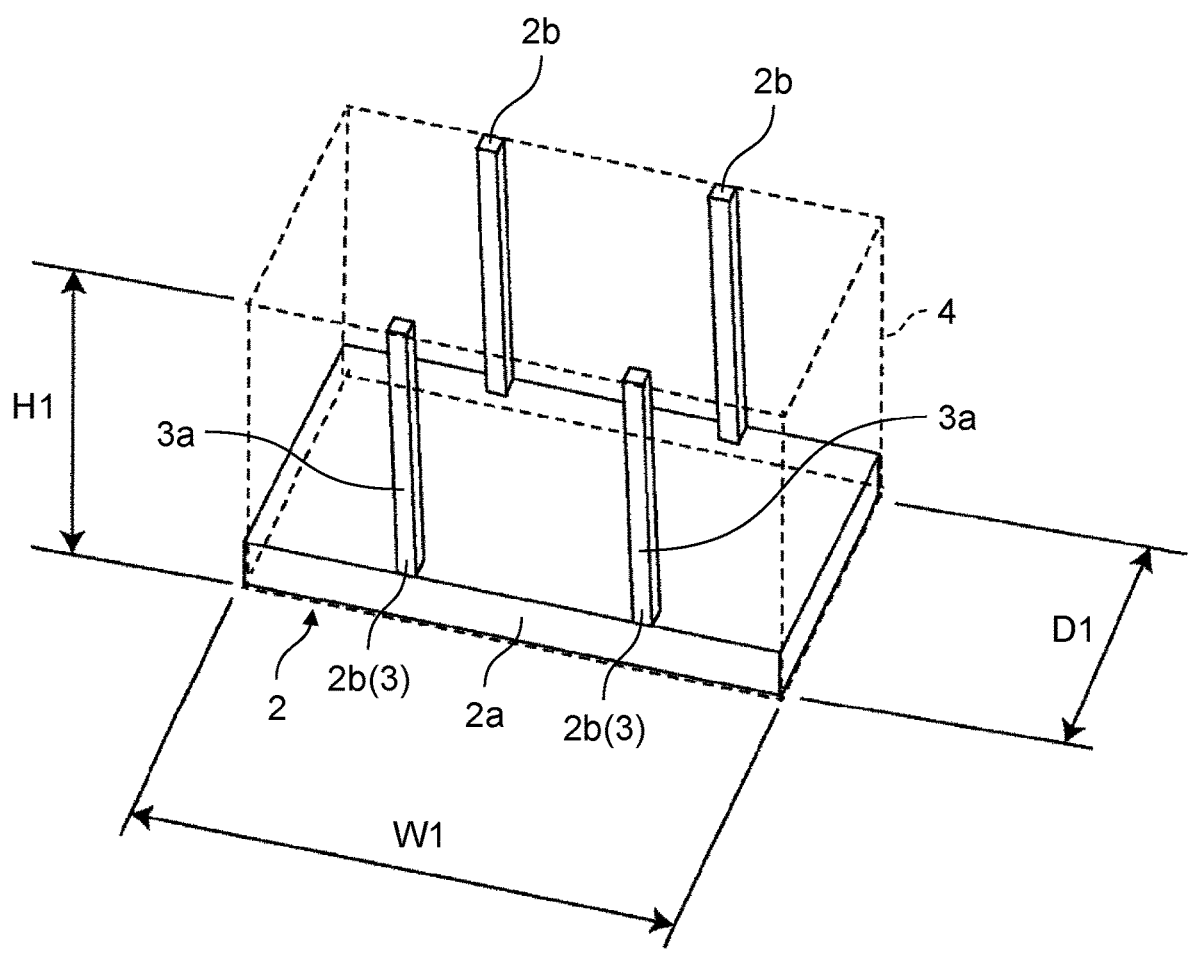
FIG. 2 is a schematic diagram illustrating an example of a pallet.

FIG. 2 is a schematic diagram illustrating an example of pallet 2. As illustrated in FIG. 2, pallet 2 has bottom plate 2a and a plurality of struts 2b disposed on bottom plate 2a. Bottom plate 2a is formed by a rectangular plate member having a longitudinal direction and a lateral direction in plan view. The plurality of struts 2b extend upward from bottom plate 2a, and are arranged apart from each other along an outer edge of bottom plate 2a.

In the first exemplary embodiment, pallet 2 has four struts 2b. Specifically, two struts 2b are arranged on a first end side of bottom plate 2a in the lateral direction, and two struts 2b are arranged on a second end side of bottom plate 2a in the lateral direction. Two struts 2b to be arranged on the first end side of bottom plate 2a in the lateral direction are arranged along the outer edge of bottom plate 2a, and are arranged apart from each other in the longitudinal direction of bottom plate 2a. Two struts 2b to be arranged on the second end side of bottom plate 2a in the lateral direction are arranged along the outer edge of bottom plate 2a, and are arranged apart from each other in the longitudinal direction of bottom plate 2a. Shapes and dimensions of the plurality of struts 2b are substantially the same. In the present description, "substantially" means that an error is, for example, 5% or less. Preferably, "substantially" refers to an error of 1% or less.

In measurement device 1, two struts 2b to be arranged on the first end side of bottom plate 2a in the lateral direction are used as reference targets 3. The "reference targets" refer to targets as a reference for uniquely determining a positional relationship with respect to standard load form 4 of pallet 2. The "standard load form" refers to a standard appearance of a load placed on pallet 2 during transportation. Standard load form 4 has a prescribed size, the load not protruding from pallet 2 within the size. For example, standard load form 4 is a rectangular parallelepiped, and determined by width W1, depth D1, and height H1 of pallet 2. In the first exemplary embodiment, width W1 is a length of bottom plate 2a in the longitudinal direction, depth D1 is a length of bottom plate 2a in the lateral direction, and height H1 is a length obtained by sum of a thickness of bottom plate 2a and a height of each of struts 2b. Further, width W1, depth D1, and height H1 are predetermined standard dimensions.

The each of reference targets 3 has at least one reference plane 3a. Preferably, the each of reference targets 3 has a plurality of reference planes 3a to be arranged apart from each other on the same plane. In the first exemplary embodiment, the each of reference targets 3 has two reference planes 3a disposed on two struts 2b to be arranged along the outer edge on the first end side of bottom plate 2a in the lateral direction. Two reference planes 3a are arranged apart from each other on the same plane. In other words, two reference planes 3a are arranged on the outer edge side of one end of bottom plate 2a in the lateral direction, and arranged apart from each other in the longitudinal direction of bottom plate 2a.

In the first exemplary embodiment, the each of struts 2b is a quadrangular prism, and each of reference planes 3a has a rectangular shape with four vertexes.

Note that, reference targets 3 are not limited to two struts 2b to be arranged along the outer edge on the first end side of bottom plate 2a in the lateral direction. For example, the each of reference targets 3 may be a part of an upper structure other than the struts of the pallet, or may be at least one strut among the plurality of struts 2b, or a part of the strut.

FIG. 3 is a schematic diagram illustrating an example of capturing of target 6 including pallet 2 and load 5 by measurement device 1. As illustrated in FIG. 3, target 6 includes pallet 2 and load 5 placed on pallet 2. Imager 10 generates the 3D coordinate information (first coordinate information) by measuring distance d1 from imager 10 to target 6 with a position of imager 10 as a reference position to generate depth image data.

FIG. 4 is a schematic diagram illustrating an example of the 3D coordinate information (first coordinate information) acquired by measurement device 1. As illustrated in FIG. 4, the 3D coordinate information is depth image data indicating a depth value for each pixel to be specified by 2D coordinates (X, Y). In the first exemplary embodiment, in order to measure protruding lengths of load 5 protruding from pallet 2, imager 10 captures target 6 to capture entire pallet 2 and load 5, as illustrated in FIGS. 3 and 4.

Figure 5:
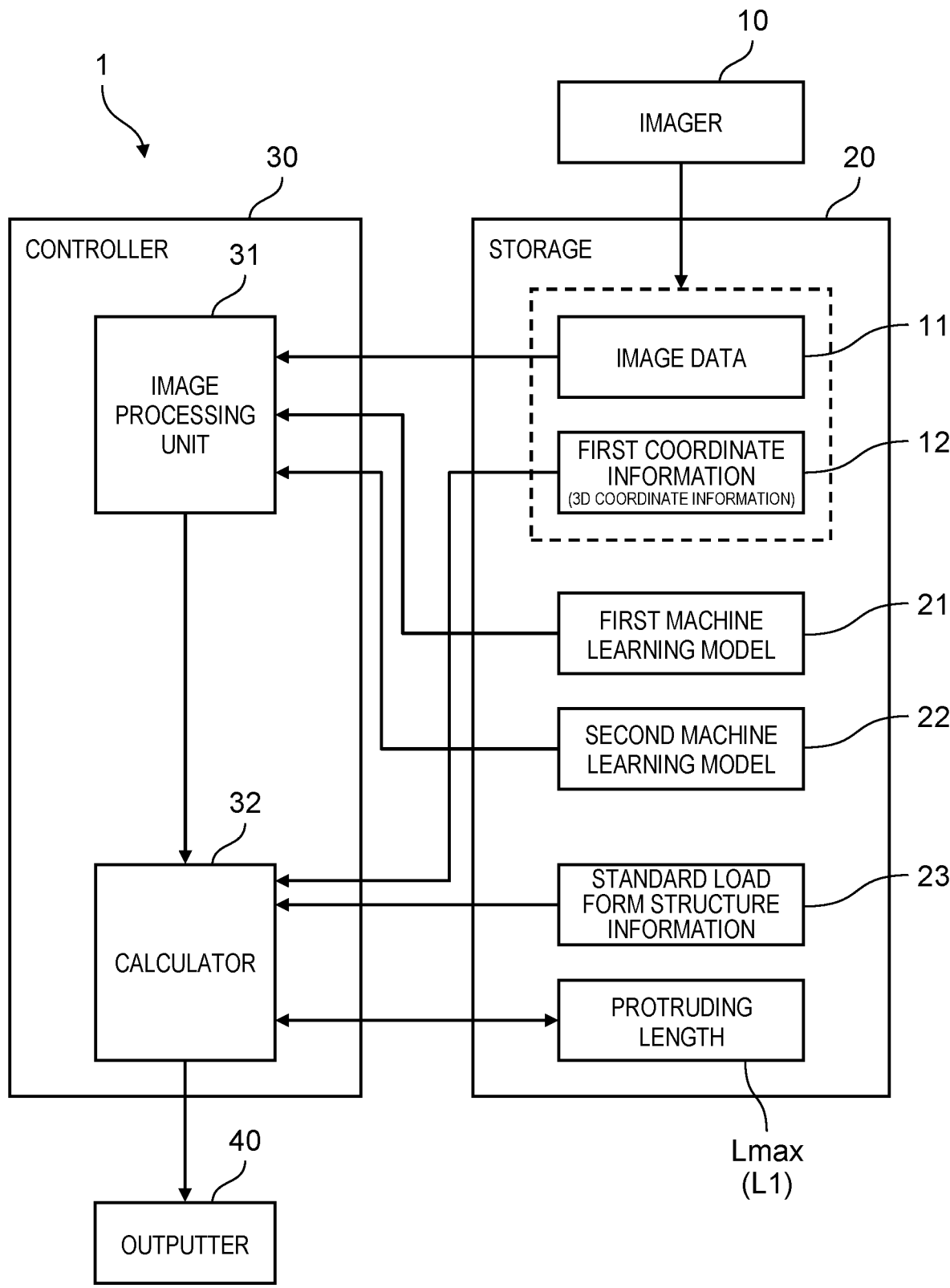
FIG. 5 is a schematic block diagram illustrating an example of a functional configuration of the measurement device of the first exemplary embodiment according to the present disclosure.

Next, a functional configuration of measurement device 1 will be described in detail with reference to FIG. 5. FIG. 5 is a schematic block diagram illustrating an example of a functional configuration of measurement device 1 of the first exemplary embodiment according to the present disclosure. As illustrated in FIG. 5, controller 30 has image processing unit 31 and calculator 32.

Imager 10 acquires image data 11 and first coordinate information 12 being 3D coordinate information associated with image data 11 by capturing target 6 including pallet 2 and load 5. Image data 11 and first coordinate information 12 are stored in storage 20.

Image processing unit 31 extracts specific regions in reference targets 3 based on image data 11 of target 6 captured by imager 10. Specifically, image processing unit 31 extracts the specific regions in reference targets 3 by using first machine learning model 21.

Figure 6:
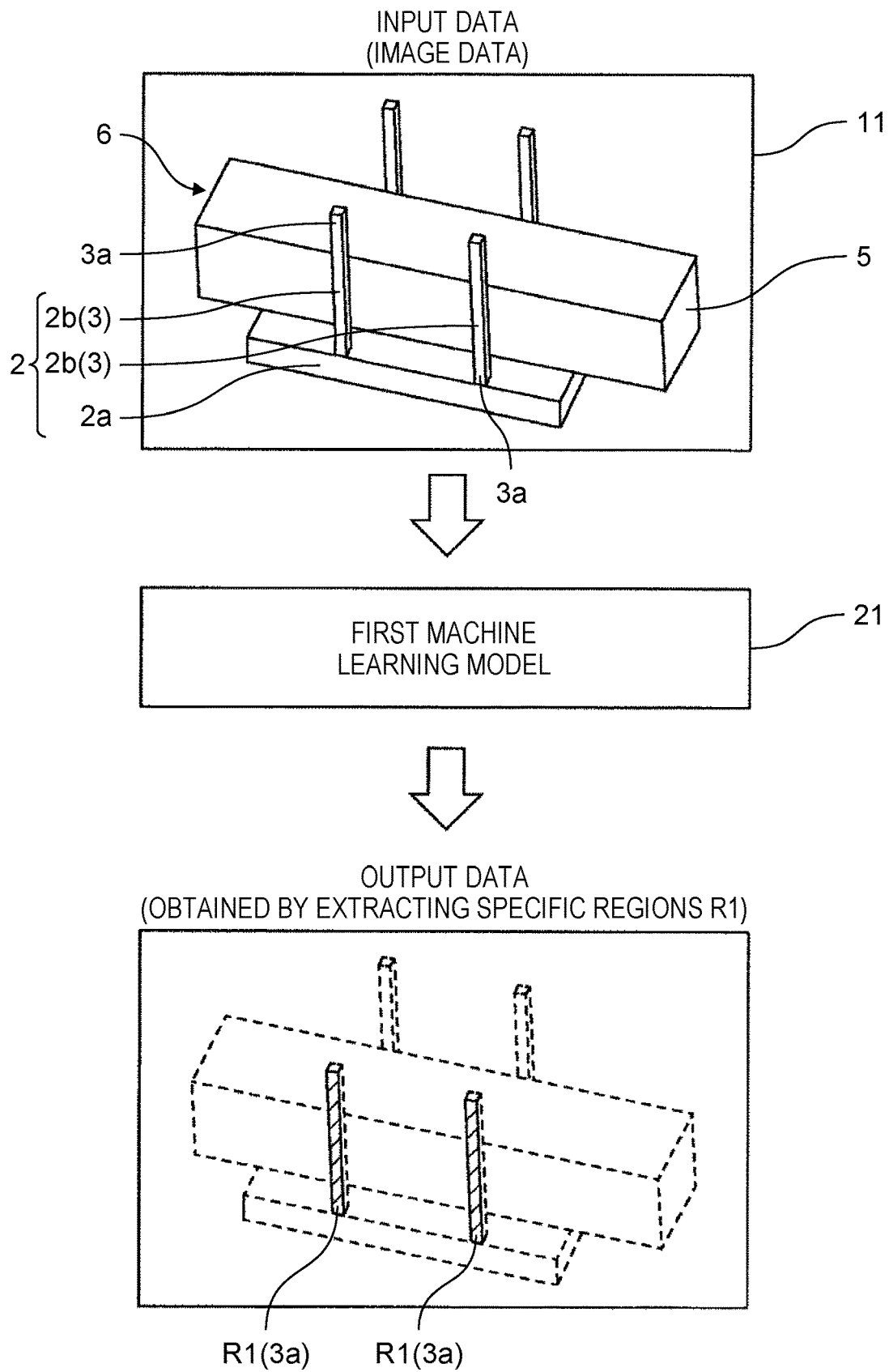
FIG. 6 is a schematic diagram illustrating an example of processes of an image processing unit by using a first machine learning model.

FIG. 6 is a schematic diagram illustrating an example of processes of image processing unit 31 by using first machine learning model 21. As illustrated in FIG. 6, image processing unit 31 inputs, as the input data, image data 11 to first machine learning model 21. First machine learning model 21 outputs data obtained by extracting specific regions R1 in image data 11. Image processing unit 31 acquires data obtained by extracting specific region R1 from first machine learning model 21. The "data obtained by extracting specific regions R1" refers to, for example, data including coordinates representing pixels occupied by specific regions R1 in image data 11.

Specific regions R1 are 2D plane regions included in reference targets 3. Image processing unit 31 extracts specific regions R1 based on at least one reference plane 3a. In the first exemplary embodiment, reference targets 3 are two struts 2b to be arranged along the outer edge of bottom plate 2a on the first end side of bottom plate 2a of pallet 2 in the lateral direction. Two struts 2b have planes as reference planes 3a on the outer edge side of bottom plate 2a. Image processing unit 31 extracts specific regions R1 based on the planes. Specifically, image processing unit 31 extracts entire reference planes 3a as specific regions R1 in each of two struts 2b (reference targets 3) from target 6 captured in image data 11. In other words, image processing unit 31 detects two reference planes 3a from target 6 captured in image data 11, and extracts two reference planes 3a detected as two specific regions R1.

Note that, specific regions R1 are not limited to entire reference planes 3a. For example, specific regions R1 may be parts of reference planes 3a other than entire reference planes 3a. Alternatively, each of specific region R1 may be a portion defined by a specific color, a specific pattern, or a specific character in reference plane 3a.

First machine learning model 21 is stored in storage 20. In first machine learning model 21, machine learning model is trained by using, as training data, image data of pallet 2 having reference targets 3 and data indicating specific regions R1 in reference targets 3. The "data indicating specific regions R1 in reference targets 3" refers to data, specific regions R1 being labeled in the data. In the first exemplary embodiment, the data indicating specific regions R1 in reference targets 3 is data indicating entire reference plane 3a of the each of reference targets 3.

In the first exemplary embodiment, first machine learning model 21 is the Key Point Detection using the Mask R-CNN. The "Key Point Detection" refers to a technique for detecting a plurality of coordinate points from the image data input. In the present exemplary embodiment, a region to be defined from the coordinate points is extracted by detecting coordinate points of the vertexes.

Note that, first machine learning model 21 is not limited to the Key Point Detection using the Mask R-CNN. First machine learning model 21 may be, for example, Deep Pose and Instance Segmentation.

Reference targets 3 has a plurality of vertexes defining reference planes 3a, that is, specific regions R1. First machine learning model 21 detects a plurality of vertexes in image data 11, and extracts 2D regions surrounded by the plurality of vertexes detected as specific regions R1.

Figure 7:
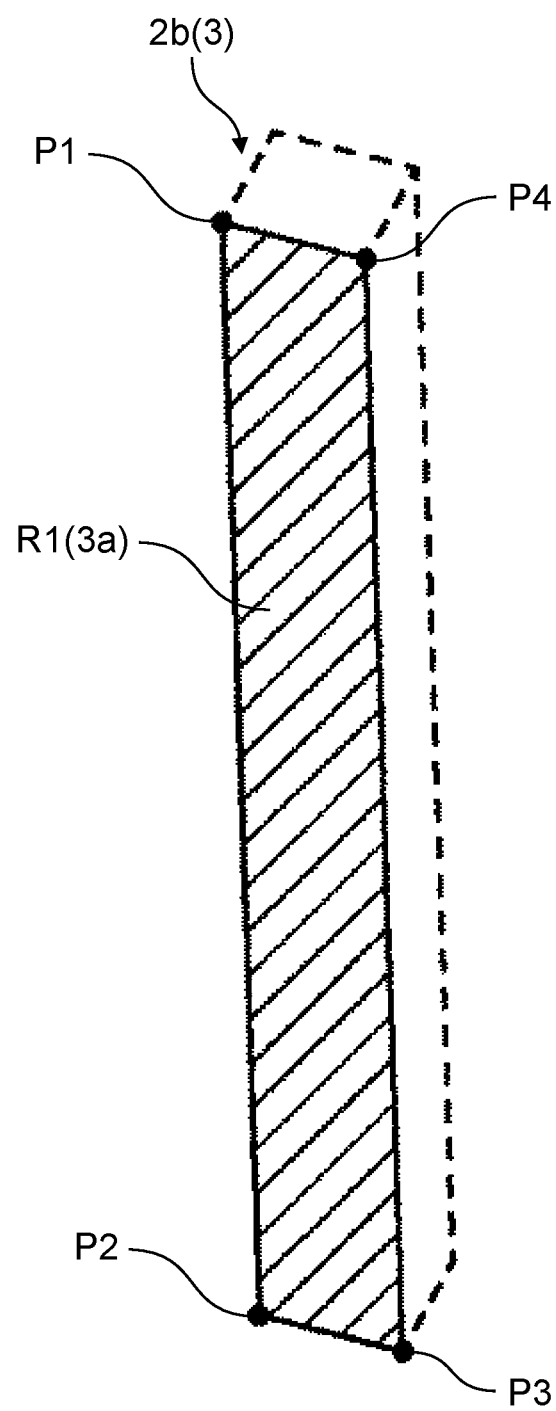
FIG. 7 is a schematic diagram illustrating an example of a specific region.

FIG. 7 is a schematic diagram illustrating an example of specific region R1. FIG. 7 illustrates an example where reference plane 3a in a rectangular shape is extracted as specific region R1. As illustrated in FIG. 7, reference target 3 has four vertexes P1 to P4 defining reference plane 3a in the rectangular shape. In first machine learning model 21, data indicating the four vertexes P1 to P4 defining reference plane 3a in the rectangular shape is used as "data indicating specific region R1 in reference target 3" of the training data. Accordingly, in a case where image data 11 is input, first machine learning model 21 detects the four vertexes P1 to P4 defining reference planes 3a, and extracts a region surrounded by the four vertexes P1 to P4 detected as specific region R1.

Note that, first machine learning model 21 may be updated by further training by using image data 11 captured with imager 10 as the training data.

Further, image processing unit 31 extracts a region of load 5 based on image data 11 of target 6 captured by imager 10. Specifically, image processing unit 31 extracts the region of load 5 by using second machine learning model 22.

FIG. 8 is a schematic diagram illustrating an example of processes of image processing unit 31 by using second machine learning model 22. As illustrated in FIG. 8, image processing unit 31 inputs, as the input data, image data 11 to second machine learning model 22. Second machine learning model 22 outputs data obtained by extracting region R2 of load 5 in image data 11. Image processing unit 31 acquires data obtained by extracting region R2 of load 5 from second machine learning model 22. The "data obtained by extracting region R2 of load 5" refers to, for example, data including coordinates representing pixels occupied by region R2 of load 5 in image data 11.

Second machine learning model 22 is stored in storage 20. In second machine learning model 22, the machine learning model is trained by using, as training data, image data 11 of load 5 placed on pallet 2 and data indicating region R2 of load 5. The "data indicating region R2 of load 5" refers to data, region R2 of load 5 being labeled in the data.

In the first exemplary embodiment, second machine learning model 22 is the Instance Segmentation using the Mask R-CNN model. The "Instance Segmentation" refers to a technique for classifying objects and extracting an object region in units of one pixel.

Note that, second machine learning model 22 is not limited to the Instance Segmentation using the Mask R-CNN model. Second machine learning model 22 may be, for example, Deep Mask and Semantic Segmentation.

Note that, second machine learning model 22 may be updated by further training by using image data 11 captured with imager 10 as the training data.

Information of specific regions R1 and region R2 of load 5 extracted by image processing unit 31 is transmitted to calculator 32.

Returning to FIG. 5, calculator 32 acquires first coordinate information 12 indicating 3D coordinates associated with image data 11 and standard load form structure information 23 indicating structural dimensions of standard load form 4 of pallet 2 associated with coordinates of specific regions R1. Further, calculator 32 calculates protruding lengths L1 of load 5 protruding from pallet 2 based on specific regions R1, region R2 of load 5, first coordinate information 12, and standard load form structure information 23.

First coordinate information 12 and standard load form structure information 23 are stored in storage 20. Calculator 32 acquires first coordinate information 12 and standard load form structure information 23 from storage 20. Further, calculator 32 acquires the information of specific regions R1 and region R2 of load 5 from image processing unit 31.

Calculator 32 acquires information of 3D coordinates of specific regions R1 based on the information of specific region R1 and first coordinate information 12 acquired from image processing unit 31. First coordinate information 12 is information of 3D coordinates corresponding to image data 11. Therefore, calculator 32 can easily acquire the 3D coordinates corresponding to specific regions R1 extracted from image data 11 by image processing unit 31 from first coordinate information 12. In the present description, the information of the 3D coordinates of specific regions R1 acquired based on the information of specific regions R1 and first coordinate information 12 acquired from image processing unit 31 may be referred to as "second coordinate information".

Further, calculator 32 acquires 3D coordinate information of standard load form 4 to be defined by specific regions R1 based on the 3D coordinates (second coordinate information) of specific regions R1 and standard load form structure information 23. In the present description, the 3D coordinate information of standard load form 4 acquired based on the second coordinate information and standard load form structure information 23 may be referred to as "third coordinate information".

Figure 9:
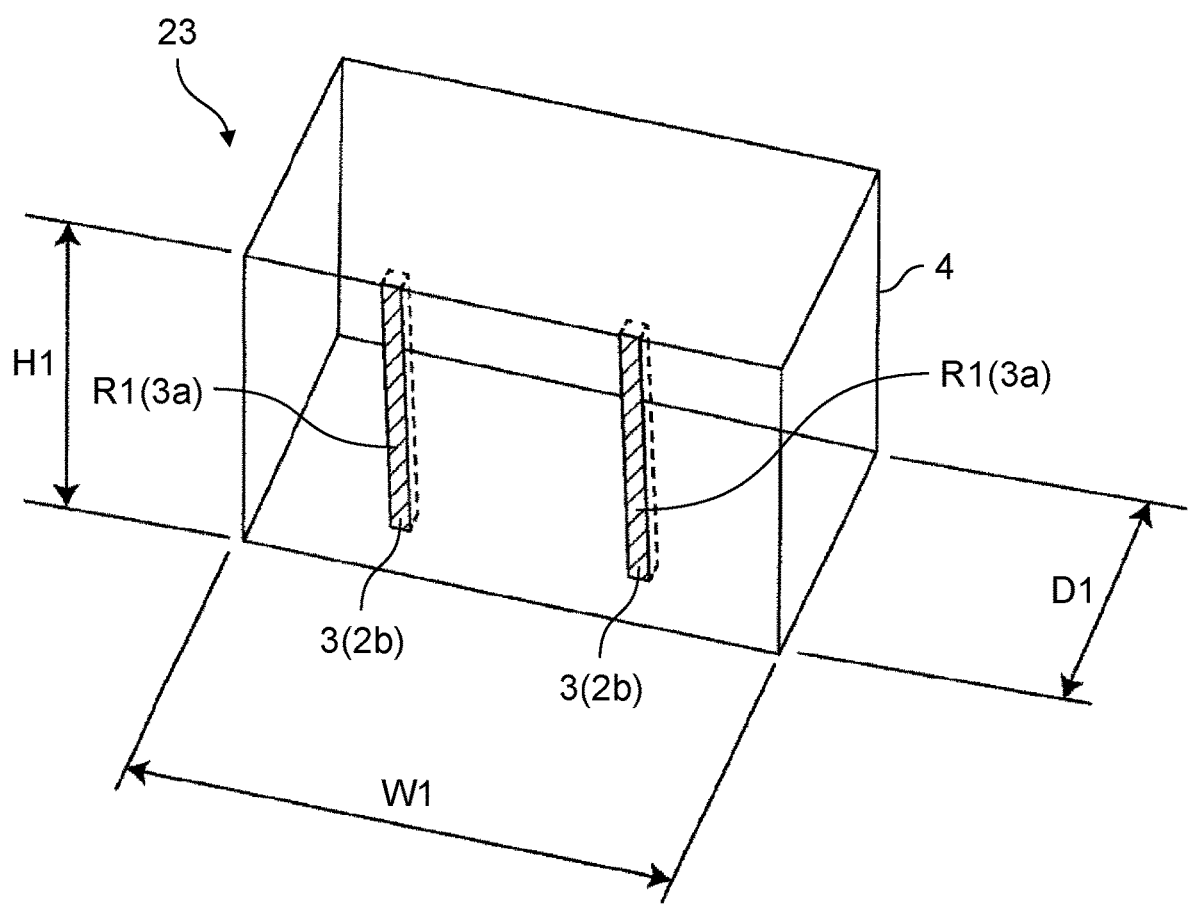
FIG. 9 is a schematic diagram illustrating an example of standard load form structure information.
Figure 10:
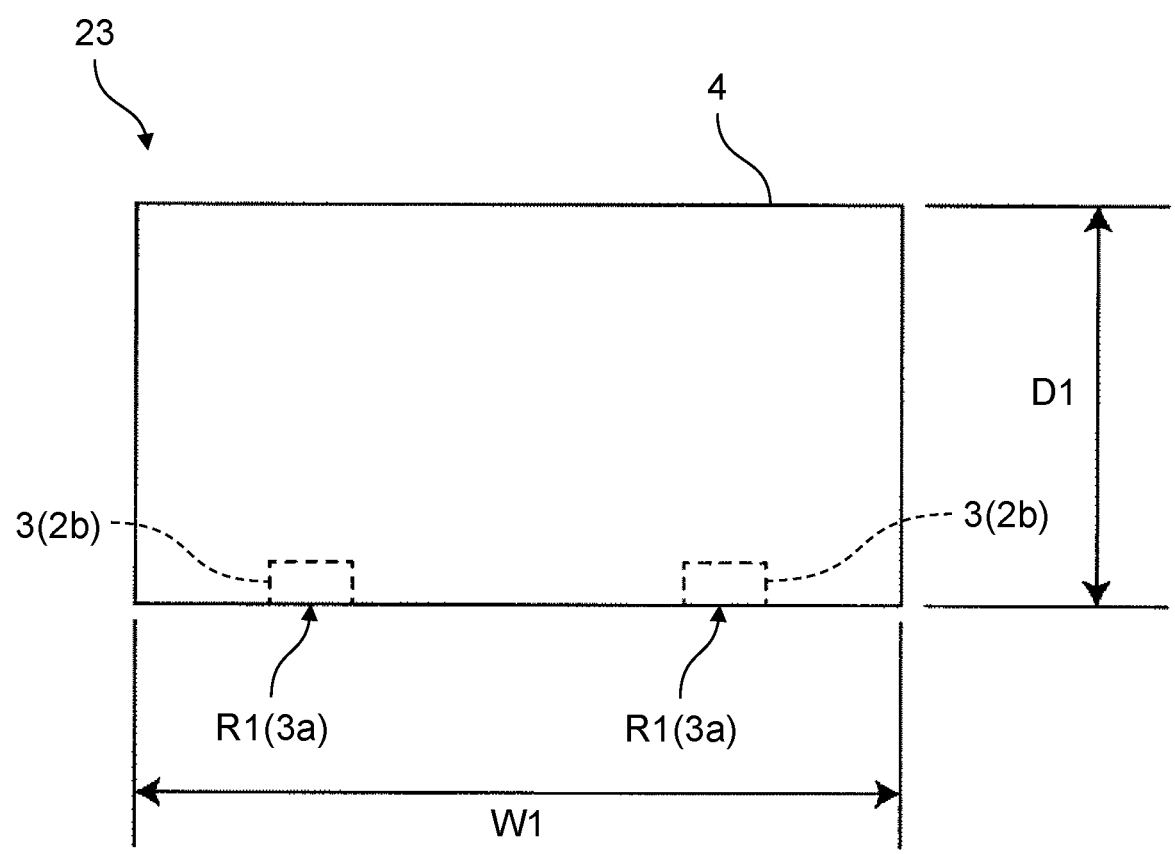
FIG. 10 is a schematic plan view of the standard load form structure information in FIG. 9.

Standard load form structure information 23 is information indicating structural dimensions of standard load form 4 and a positional relationship between specific regions R1 and standard load form 4. FIG. 9 is a schematic diagram illustrating an example of standard load form structure information 23. FIG. 10 is a schematic plan view of standard load form structure information 23 in FIG. 9. As illustrated in FIGS. 9 and 10, standard load form structure information 23 includes information of positions (3D coordinates) of specific regions R1 and information of structural dimensions (width W1, depth D1, and height H1) of standard load form 4 associated with the positions (3D coordinates) of specific regions R1. The "information of structural dimensions of standard load form 4 associated with the positions (3D coordinates) of specific regions R1" refers to information of the structural dimensions of standard load form 4, the positional relationship with specific regions R1 being uniquely defined in the information. Note that, standard load form structure information 23 may include relative position information of at least one surface with respect to a surface located on a specific region R1 side among six surfaces constituting standard load form 4. Specifically, standard load form structure information 23 may include relative position information of at least a surface for calculating protruding lengths L1 of load 5 with respect to the surface located on the specific region R1 side in standard load form 4. For example, in a case where protruding lengths L1 of load 5 from a right plane of standard load form 4 is calculated, standard load form structure information 23 may include relative position information of the right plane of standard load form 4 with respect to the surface (front surface) located on the specific region R1 side. Alternatively, standard load form structure information 23 may include relative position information of a left surface, the front surface or a back surface, and an upper surface or a lower surface.

The third coordinate information is the 3D coordinate information of standard load form 4 to be acquired based on the second coordinate information and standard load form structure information 23, and may include 3D coordinate information of at least one plane among six planes of standard load form 4. Specifically, the third coordinate information may include 3D coordinate information of at least a surface for calculating protruding lengths L1 of load 5 in standard load form 4. For example, in a case of calculating protruding lengths L1 of load 5 from the right plane of standard load form 4, the third coordinate information may include 3D coordinate information of the right plane of standard load form 4. In a case of calculating protruding lengths L1 of load 5 from two planes of the right plane and the left plane of standard load form 4, the third coordinate information may include 3D coordinate information of the two planes of the right plane and the left plane of standard load form 4. Alternatively, the third coordinate information may include the 3D coordinate information of the six planes of standard load form 4.

Further, calculator 32 acquires information of 3D coordinates of region R2 of load 5 based on the information of region R2 of load 5 and first coordinate information 12 acquired from image processing unit 31. First coordinate information 12 is the information of the 3D coordinates corresponding to image data 11. Therefore, calculator 32 can easily acquire the 3D coordinates of region R2 of load 5 extracted from image data 11 by image processing unit 31 from first coordinate information 12. In the present description, the information of the 3D coordinates of region R2 of load 5 acquired based on the information of region R2 of load 5 and first coordinate information 12 acquired from image processing unit 31 may be referred to as "fourth coordinate information".

Further, calculator 32 calculates protruding lengths L1 of load 5 based on the 3D coordinate information (third coordinate information) of standard load form 4 and the information (fourth coordinate information) of the 3D coordinates of region R2 of load 5.

Figure 11:
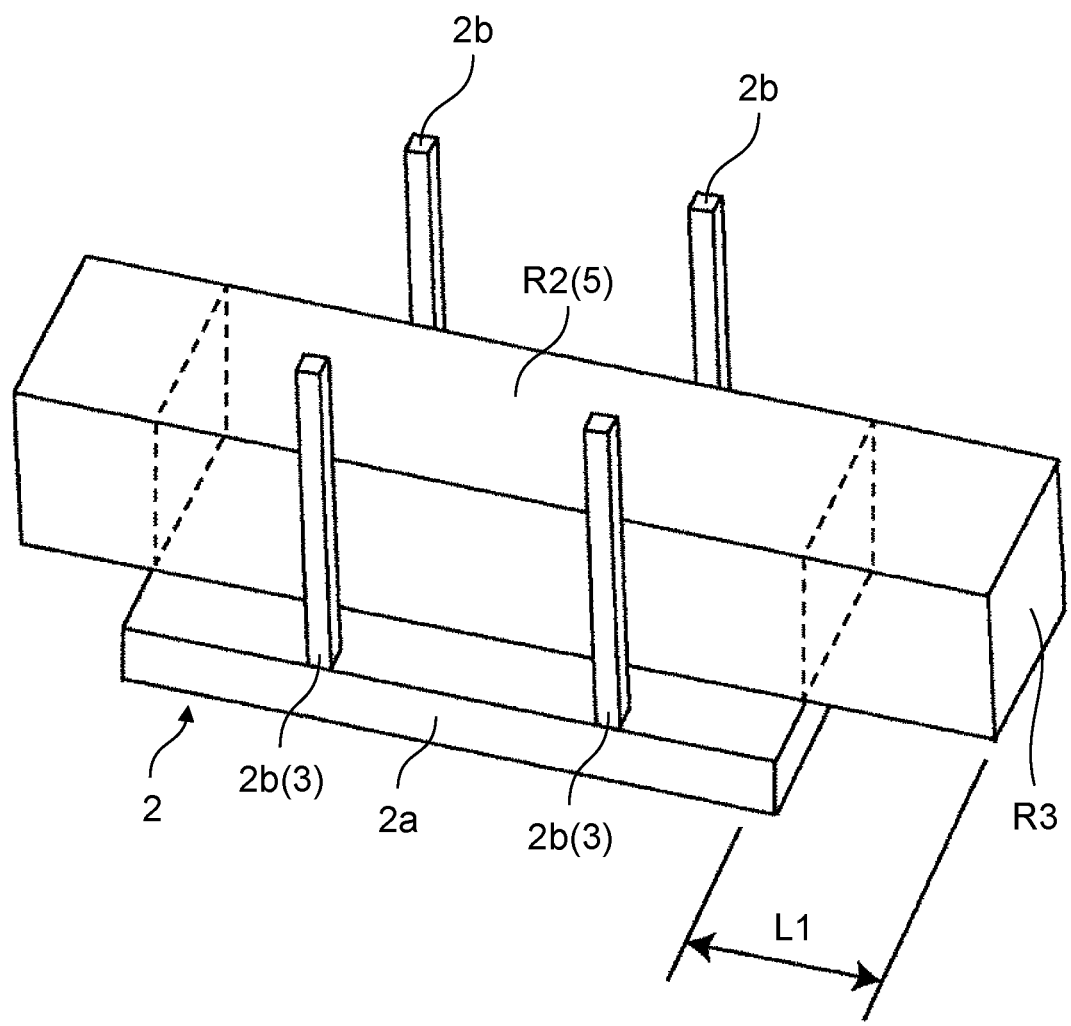
FIG. 11 is a schematic diagram illustrating an example of a calculation process of protruding lengths of the load by a calculator.
Figure 12:
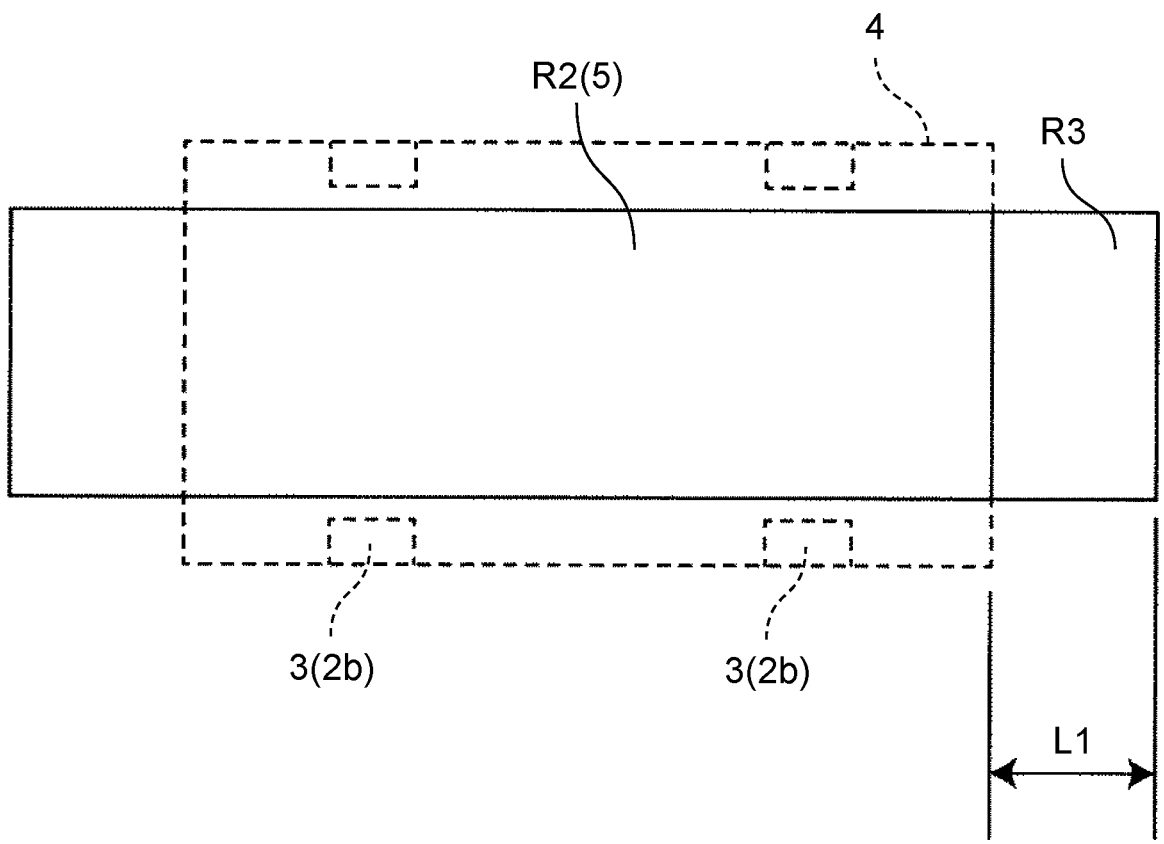
FIG. 12 is a schematic diagram illustrating an example of a calculation process of the protruding lengths of the load by the calculator.

Calculator 32 calculates protruding lengths L1 for each pixel in region R2 of load FIGS. 11 and 12 are schematic diagrams illustrating examples of calculation processes of protruding lengths L1 of load 5 by calculator 32. FIG. 11 is a 3D image diagram, and FIG. 12 is a 2D image diagram. Further, in the examples illustrated in FIGS. 11 and 12, load 5 protruding to a right side of pallet 2 is focused on and shown to facilitate the description. In FIGS. 11 and 12, protruding region R3 of load 5 protruding from standard load form 4 is illustrated. As illustrated in FIGS. 11 and 12, calculator 32 calculates lengths (protruding lengths) of protruding region R3 of load 5 protruding from standard load form 4 in region R2 of load 5.

Further, calculator 32 calculates maximum protruding length Lmax among protruding lengths L1. In other words, calculator 32 calculates maximum protruding length Lmax of a most protruding portion among protruding lengths L1 of load 5 protruding from standard load form 4. Note that, maximum protruding length Lmax and protruding lengths L1 calculated by calculator 32 are stored in storage 20. Calculator 32 transmits information of maximum protruding length Lmax to outputter 40.

Outputter 40 acquires the information of maximum protruding length Lmax from calculator 32, and outputs the information of maximum protruding length Lmax.

[Actions]

Figure 13:
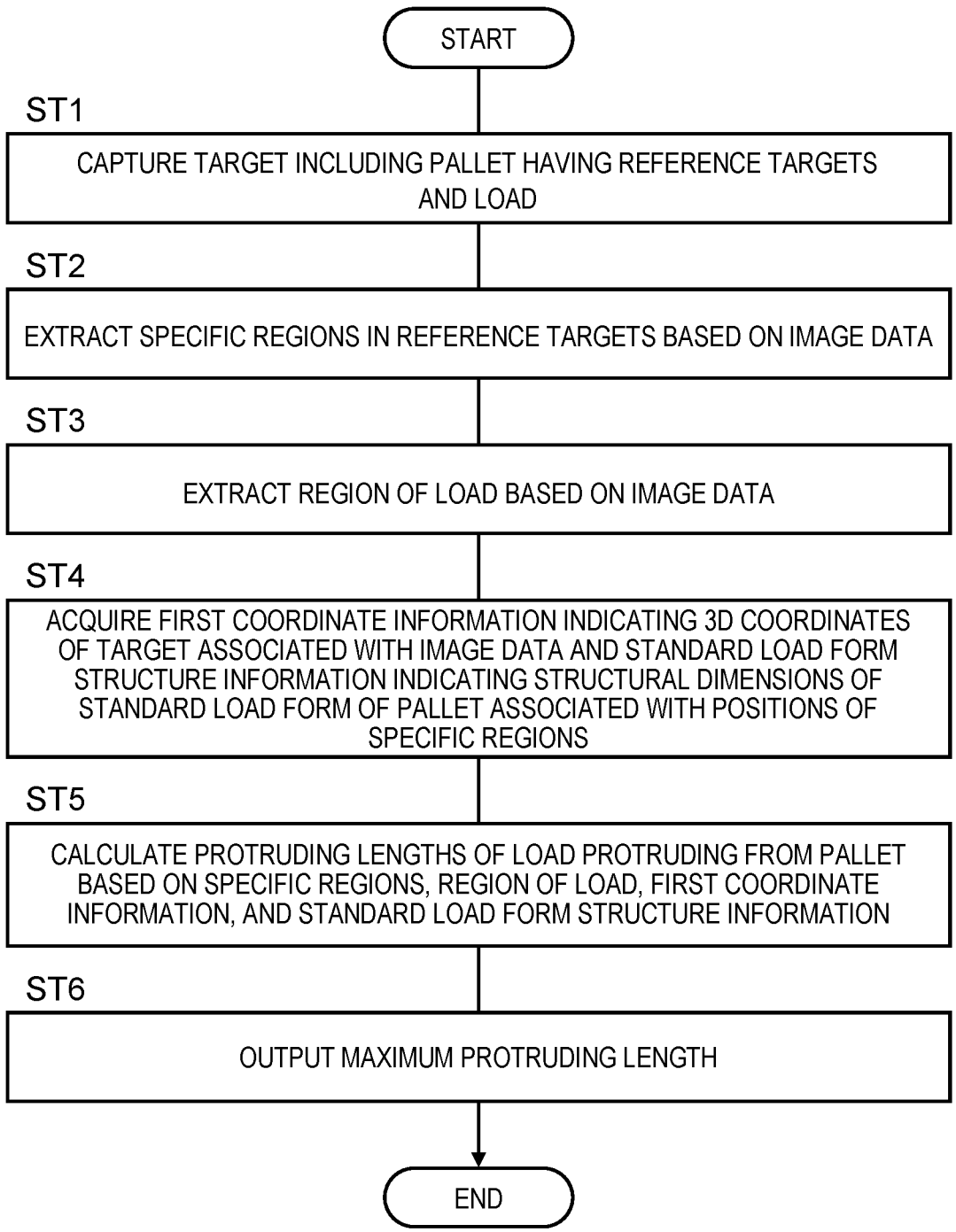
FIG. 13 is a flowchart of an example of a measurement method of the first exemplary embodiment according to the present disclosure.

Next, actions of measurement device 1, that is, the measurement method to be performed by measurement device 1 will be described with reference to FIG. 13. FIG. 13 is a flowchart of an example of the measurement method of the first exemplary embodiment according to the present disclosure. Each process of the flowchart of the measurement method illustrated in FIG. 13 is performed by measurement device 1. As illustrated in FIG. 13, the measurement method includes steps ST1 to ST6.

In step ST1, imager 10 captures target 6 including pallet 2 having reference targets 3 and load 5. Imager 10 acquires image data 11 being a color image with target 6 captured therein and first coordinate information 12 (with reference to FIG. 4) indicating the 3D coordinates associated with image data 11 by capturing target 6. Image data 11 and first coordinate information 12 acquired are stored in storage 20.

In step ST2, image processing unit 31 extracts specific regions R1 in reference targets 3 based on image data 11 of target 6 captured. Image processing unit 31 acquires output data obtained by inputting, as the input data, image data 11 of target 6 captured to first machine learning model 21 to extract specific regions R1 in reference targets 3 (with reference to FIG. 6).

Specifically, image processing unit 31 extracts reference planes 3a of reference targets 3 as specific regions R1. In the first exemplary embodiment, since reference targets 3 are the two struts 2b to be arranged on the first end side of bottom plate 2a in the lateral direction, reference planes 3a are two rectangular planes to be arranged on the outer edge side of the one end in the lateral direction of bottom plate 2a of pallet 2 in each of the two struts 2b (with reference to FIG. 2).

As described above, first machine learning model 21 is the Key Point Detection using the Mask R-CNN. In the case where image data 11 is input, first machine learning model 21 detects the four vertexes defining reference plane 3a in the rectangular shape in the each of reference targets 3. Image processing unit 31 extracts specific regions R1 from the four vertexes detected by first machine learning model 21. The information of specific regions R1 detected is transmitted to calculator 32.

In step ST3, image processing unit 31 extracts region R2 of load 5 based on image data 11 of target 6 captured. Image processing unit 31 acquires the output data obtained by inputting, as the input data, image data 11 of target 6 captured to second machine learning model 22 to extract region R2 of load 5 (with reference to FIG. 8).

As described above, second machine learning model 22 is the Instance Segmentation using the Mask R-CNN model. In the case where image data 11 is input, second machine learning model 22 extracts region R2 of load 5. The information of region R2 of load 5 extracted is transmitted to calculator 32.

In step ST4, calculator 32 acquires first coordinate information 12 and standard load form structure information 23 (with reference to FIGS. 9 and 10). First coordinate information 12 is information indicating the 3D coordinates associated with image data 11, and standard load form structure information 23 is information indicating the structural dimensions of standard load form 4 of pallet 2 associated with the positions (3D coordinates) of specific regions R1. In the first exemplary embodiment, first coordinate information 12 is acquired by imager 10 and stored in storage 20. Further, standard load form structure information 23 is stored in storage 20 in advance. Therefore, calculator 32 acquires first coordinate information 12 and standard load form structure information 23 from storage 20.

In step ST5, calculator 32 calculates protruding lengths L1 of load 5 protruding from pallet 2 based on specific regions R1, region R2 of load 5, first coordinate information 12, and standard load form structure information 23 (with reference to FIGS. 11 and 12).

Calculator 32 transmits the information of maximum protruding length Lmax among protruding lengths L1 calculated to outputter 40.

In step ST6, outputter 40 outputs maximum protruding length Lmax.

In this way, measurement device 1 can measure the protruding lengths of load 5 from pallet 2 by performing steps ST1 to ST6. Note that, in the measurement method described above, step ST6 is not an essential configuration. For example, in a case where measurement device 1 does not include outputter 40, the measurement method may not include step ST6.

Figure 14:
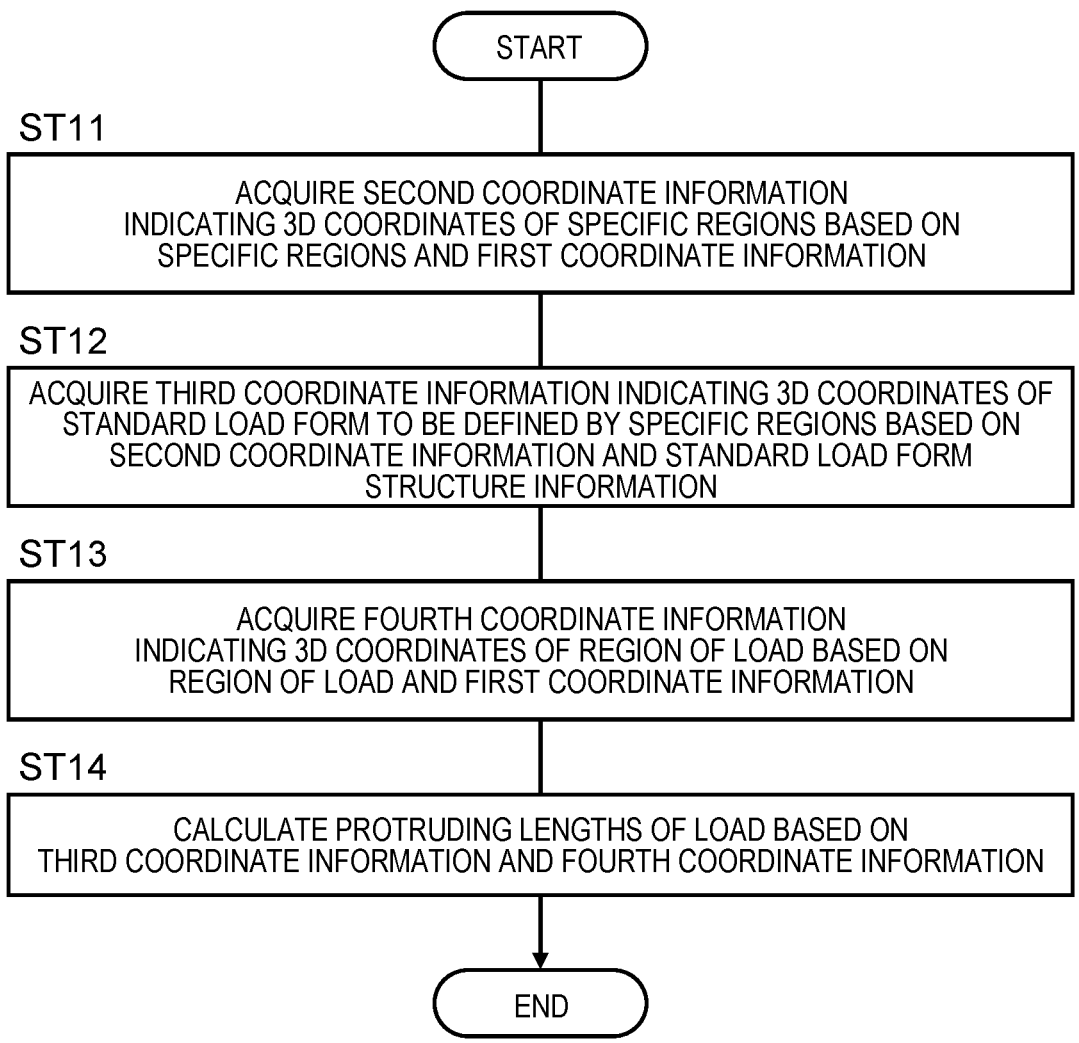
FIG. 14 is a flowchart illustrating an example of processes of the calculator.

An example of processes of calculator 32 in step ST5 of calculating protruding lengths L1 will be described in detail with reference to FIG. 14. FIG. 14 is a flowchart illustrating an example of processes of calculator 32. As illustrated in FIG. 14, calculator 32 performs steps ST11 to ST14 in a process of calculating protruding lengths L1 (step ST5).

In step ST11, calculator 32 acquires the second coordinate information indicating the 3D coordinates of specific regions R1 based on specific regions R1 and first coordinate information 12. Specifically, calculator 32 acquires the 3D coordinates (second coordinate information) of specific regions R1 based on the information of specific regions R1 extracted in step ST2 and first coordinate information 12 acquired in step ST4. First coordinate information 12 is the information of the 3D coordinates corresponding to image data 11 (with reference to FIG. 4). Calculator 32 acquires, from first coordinate information 12, the 3D coordinates corresponding to specific regions R1 extracted.

In step ST12, calculator 32 acquires the third coordinate information indicating the 3D coordinates of standard load form 4 to be defined by specific regions R1 based on the second coordinate information and standard load form structure information 23. Specifically, calculator 32 acquires the 3D coordinates (third coordinate information) of standard load form 4 to be defined by specific regions R1 based on the second coordinate information acquired in step ST11 and standard load form structure information 23 acquired in step ST4. Standard load form structure information 23 is the information indicating the structural dimensions of standard load form 4 and the positional relationship between specific regions R1 and standard load form 4, and includes the information of the coordinates of specific regions R1 and the information of the structural dimensions of standard load form 4 associated with the coordinates of specific regions R1 (with reference to FIGS. 9 and 10). Calculator 32 determines the 3D coordinates of standard load form 4 based on the 3D coordinates of specific regions R1.

In the first exemplary embodiment, the third coordinate information is the information of the 3D coordinates of the protruding plane as the reference for the protruding of load 5 in standard load form 4. Protruding plane PL0 is at least one surface to be determined from the six planes of standard load form 4, and determined in advance. For example, in a case of calculating protruding lengths L1 of load 5 from the right plane of standard load form 4, the right plane of standard load form 4 is determined in advance as protruding plane PL0. 3D coordinate information of protruding plane PL0 can be calculated by, for example, the plane equation. The plane equation will be described later.

In step ST13, calculator 32 acquires the fourth coordinate information indicating the 3D coordinates of region R2 of load 5 based on region R2 of load 5 and first coordinate information 12. Specifically, calculator 32 calculates the 3D coordinates (fourth coordinate information) of region R2 of load 5 based on the information of region R2 of load 5 acquired in step ST3 and first coordinate information 12 acquired in step ST4. First coordinate information 12 is the information of the 3D coordinates corresponding to image data 11 (with reference to FIG. 4). Calculator 32 acquires, from first coordinate information 12, the 3D coordinates corresponding to region R2 of load 5 extracted.

In step ST14, calculator 32 calculates protruding lengths L1 of load 5 based on the third coordinate information and the fourth coordinate information. Specifically, calculator 32 calculates protruding lengths L1 of load 5 based on the third coordinate information indicating the 3D coordinates of standard load form 4 acquired in step ST12 and the fourth coordinate information indicating the 3D coordinates of region R2 of load 5 acquired in step ST13. Specifically, calculator 32 calculates protruding lengths L1 of load 5 based on the plane equation (third coordinate information) and the fourth coordinate information of protruding plane PL0 as the reference for the protruding of load 5 in standard load form 4.

Figure 15:
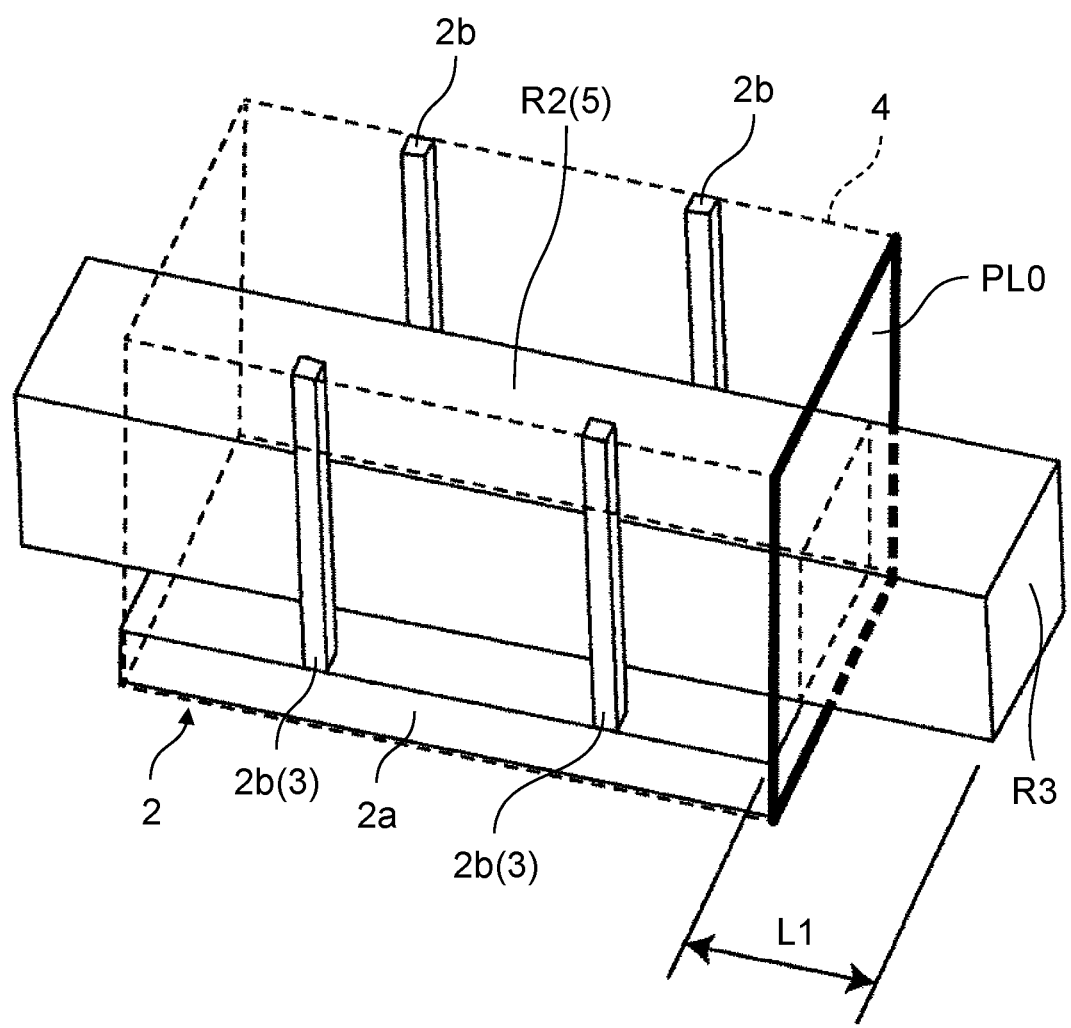
FIG. 15 is a schematic diagram illustrating an example of a protruding plane.

An example of calculation of the plane equation for protruding plane PL0 will be described. FIG. 15 is a schematic diagram illustrating an example of protruding plane PL0. Note that, FIG. 15 illustrates an example where the right plane of standard load form 4 is protruding plane PL0. In the example illustrated in FIG. 15, the right plane of standard load form 4 is determined in advance as protruding plane PL0.

Figure 16:
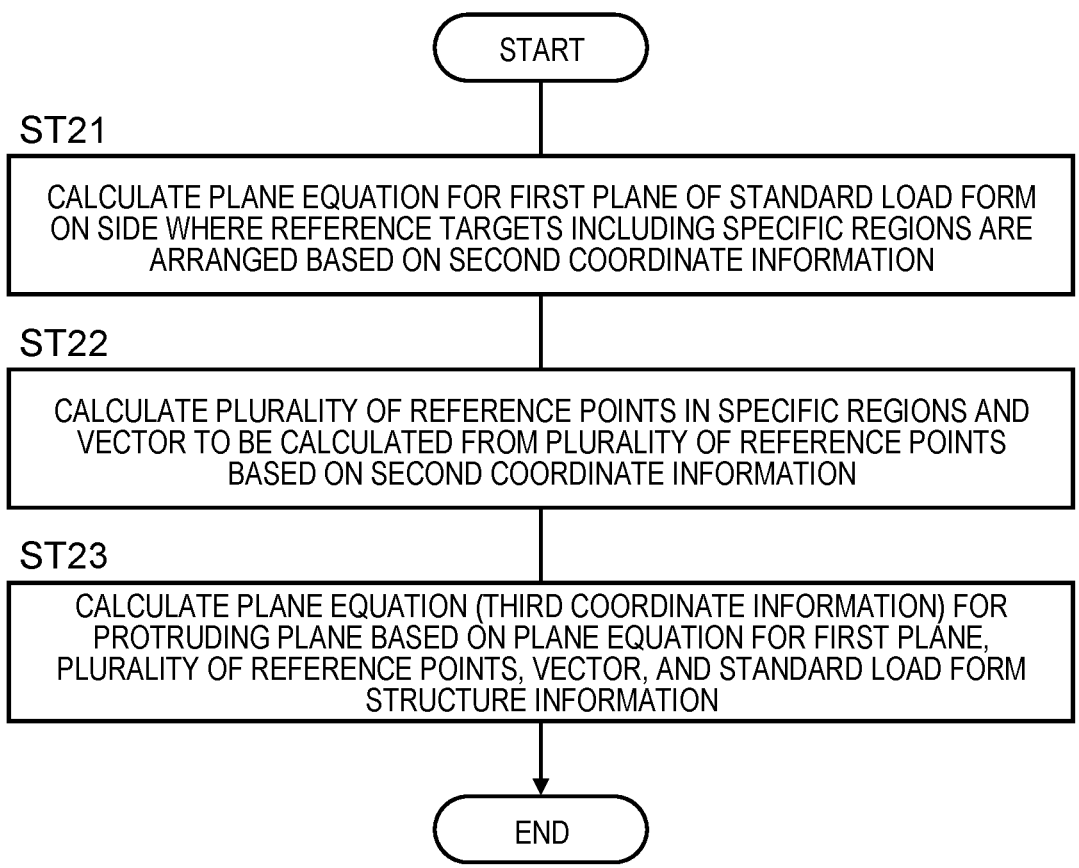
FIG. 16 is a flowchart of an example of a calculation process of a plane equation for the protruding plane.

An example of the calculation process of the plane equation for protruding plane PL0 will be described with reference to FIG. 16. FIG. 16 is a flowchart of an example of a calculation process of the plane equation for protruding plane PL0. As illustrated in FIG. 16, the calculation process of the plane equation for protruding plane PL0 includes steps ST21 to ST23. Steps ST21 to ST23 are executed by calculator 32.

Figure 17:
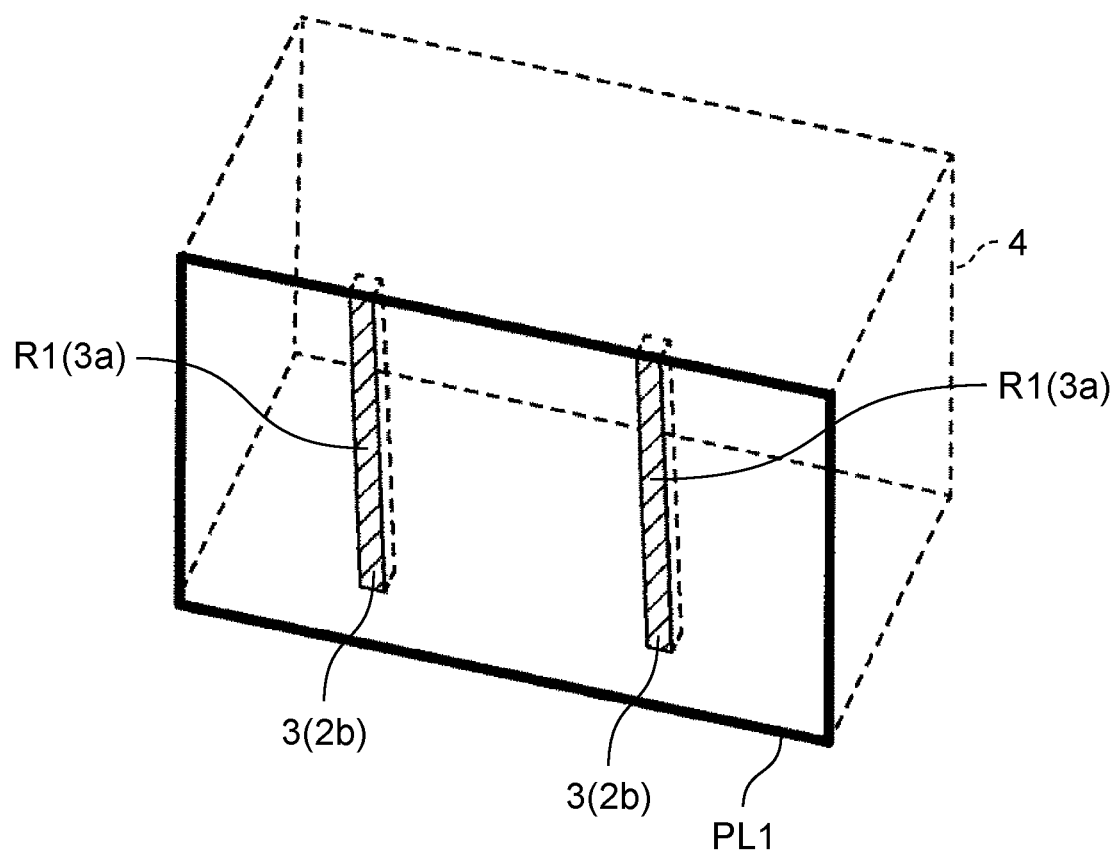
FIG. 17 is a schematic diagram illustrating a first plane of a standard load form.

In step ST21, calculator 32 calculates the plane equation for the first plane of standard load form 4 on the side where reference targets 3 including a plurality of specific regions R1 are arranged based on the second coordinate information. FIG. 17 is a schematic diagram illustrating first plane PL1 of standard load form 4. In the example of FIG. 17, first plane PL1 is a plane on the side where reference targets 3 including the plurality of specific regions R1 are arranged in standard load form 4. In the example illustrated in FIG. 17, the plane on the side where reference targets 3 are arranged refers to a plane on a front side of standard load form 4.

In the first exemplary embodiment, the second coordinate information is information indicating the 3D coordinates of the two specific regions R1 to be arranged apart from each other on the same plane. Calculator 32 estimates the plane equation for first plane PL1 based on the 3D coordinates of the two specific regions R1.

For example, a plane equation for specific regions R1 can be calculated by, for example, a least squares method or an RANSAC method as 3D point group present in the 3D coordinates of the two specific regions R1. It is possible to reduce an error in 3D coordinate acquisition and an influence due to noises by using, for example, the RANSAC method on the two specific regions R1 to be arranged apart from each other on the same plane to calculate a plane equation passing through the two specific regions R1.

In step ST22, calculator 32 calculates a plurality of reference points in specific regions R1 and a vector to be calculated from the plurality of reference points based on the second coordinate information. Calculator 32 acquires the positions and orientations of specific regions R1 by calculating the plurality of reference points and the vector. Specifically, calculator 32 calculates a line segment (the plurality of reference points and the vector) passing through a center of the each of specific regions R1.

Figure 18:
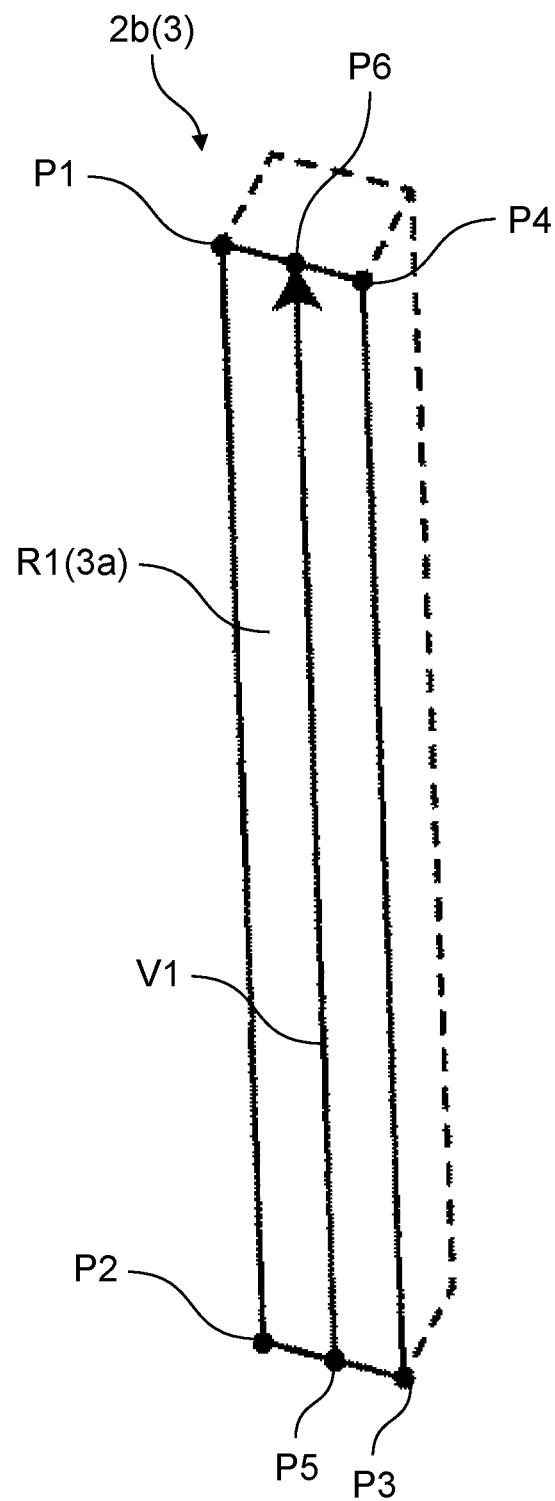
FIG. 18 is a schematic diagram illustrating an example of a calculation process of reference points and a vector in the specific region.

FIG. 18 is a schematic diagram illustrating an example of a calculation process of reference points P5 and P6 and the vector (line segment V1) in specific region R1. FIG. 18 illustrates strut 2b that is reference target 3 on the right side in FIG. 17. As illustrated in FIG. 18, calculator 32 calculates reference points P5 and P6 at a lower end and an upper end of specific region R1, respectively.

In the first exemplary embodiment, since first machine learning model 21 is the Key Point Detection using the Mask R-CNN, the four vertexes P1 to P4 defining the each of specific regions R1 are detected. Therefore, calculator 32 can easily calculate the reference points from 2D coordinates of the four vertexes P1 to P4. Specifically, calculator 32 calculates a midpoint of a lower side of the each of specific regions R1 as reference point P5, and calculates a midpoint of an upper side of the each of specific regions R1 as reference point P6. The lower side of the each of specific regions R1 is a line segment connecting vertex P2 and vertex P3, and the upper side of the each of specific regions R1 is a line segment connecting vertex P1 and vertex P4. Calculator 32 calculates the vector from reference point P5 to reference point P6, that is, line segment V1.

Note that, although an example where line segment V1 is calculated by using one strut 2b among the two struts 2b as reference targets 3 has been described, the line segment is not limited thereto. For example, line segment V1 may be a line segment passing through a center of the each of specific regions R1 of each of the two struts 2b.

In step ST23, calculator 32 calculates the plane equation (third coordinate information) for protruding plane PL0 based on the plane equation for first plane PL1, reference point P5, the vector (line segment V1), and standard load form structure information 23. In steps ST21 to ST22, information (plane equation) of first plane PL1 of standard load form 4 and line segment V1 (reference point P5 and the vector) of specific regions R1 are obtained. Calculator 32 calculates the plane equation (third coordinate information) for protruding plane PL0 by using these pieces of information and the information of the positional relationship included in standard load form structure information 23.

Figure 19:
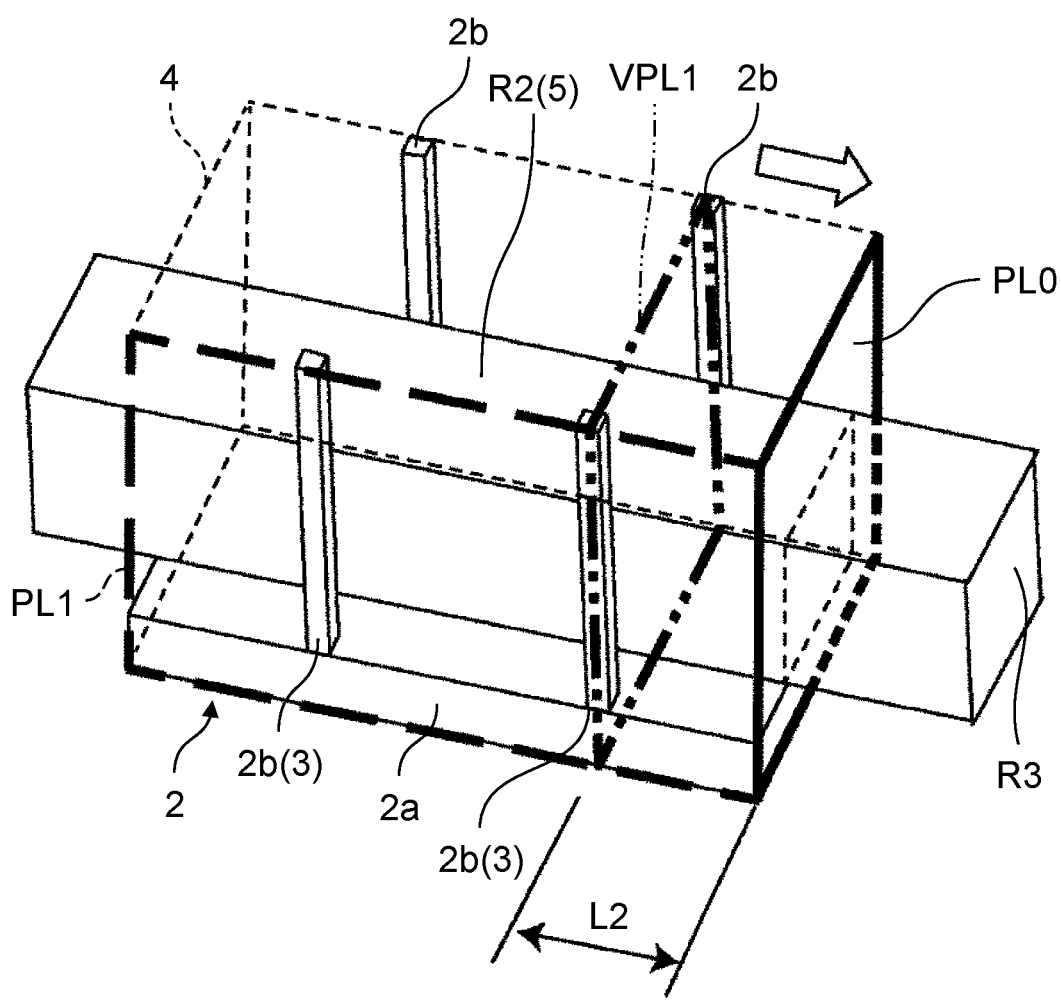
FIG. 19 is a schematic diagram illustrating an example of calculation of the protruding plane.

FIG. 19 is a schematic diagram illustrating an example of calculation of protruding plane PL0. In FIG. 19, a case where the right plane of standard load form 4 is protruding plane PL0 will be described. As illustrated in FIG. 19, calculator 32 calculates virtual plane VPL1 that is orthogonal to first plane PL1 and has a straight line extending line segment V1 as an intersection line. Calculator 32 acquires distance L2 between line segment V1 and the right plane of standard load form 4 from the structural dimensions included in standard load form structure information 23. Calculator 32 calculates the plane equation for protruding plane PL0 by translating virtual plane VPL1 rightward by distance L2. Note that, distance L2 is a distance to be uniquely determined by standard load form structure information 23.

In the example illustrated in FIG. 19, the plane equation for protruding plane PL0 on a right side of standard load form 4 is expressed by a mathematical expression below.

$$ax+by+cz+d=0 \quad \text{[Plane Equation]}$$

Here, "(a, b, c)" is a unit vector, "d" is a constant, and "(x, y, z)" are coordinates. Note that, the "(a, b, c)" is a direction unit vector that faces an outer side of standard load form 4. In the example illustrated in FIG. 15, a, b, c, and d are obtained to make "(a, b, c)" a normal direction unit vector of the right plane (protruding plane PL0) of standard load form 4 rightward in FIG. 15.

Protruding lengths L1 of load 5 from protruding plane PL0 are obtained by a mathematical expression below.

$$f(x,y,z)=ax+by+cz+d \quad \text{[Calculation Equation for Protruding Lengths]}$$

In a case where f (x, y, z)<0, the protruding lengths are 0. The calculation equation for protruding lengths L1 described above is applied to 3D coordinates constituting load 5, that is, the 3D coordinates of region R2 of load 5. Accordingly, protruding lengths L1 of protruding region R3 of load 5 located outside protruding plane PL0 can be calculated. Note that, the calculation of the plane equation for protruding plane PL0 by the equation described above is an example, and is not limited thereto.

In the first exemplary embodiment, maximum protruding length Lmax among protruding lengths L1 calculated is output.

Figure 20:
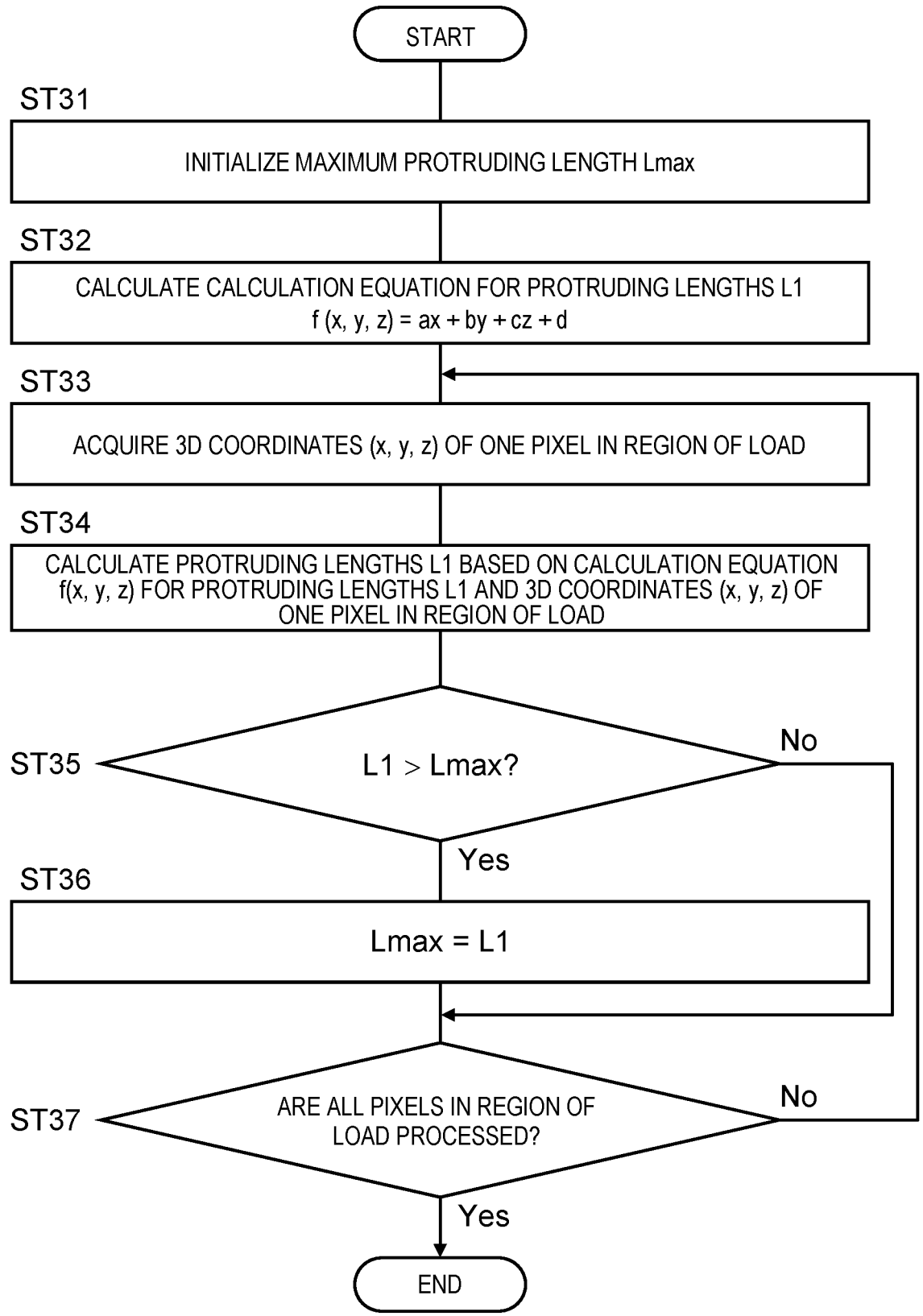
FIG. 20 is a flowchart illustrating an example of a calculation process of the protruding lengths of the load.

FIG. 20 is a flowchart illustrating an example of a calculation process of maximum protruding length Lmax of load 5. As illustrated in FIG. 20, calculator 32 performs steps ST31 to ST37 to calculate maximum protruding length Lmax of load 5.

In step ST31, calculator 32 initializes maximum protruding length Lmax to "0".

In step ST32, calculator 32 calculates a calculation equation for protruding lengths L1. Specifically, as described above, calculator 32 calculates a calculation equation "f(x, y, z)=ax+by +cz+d" for protruding lengths L1 based on the plane equation "ax+by +cz+d=0" for protruding plane PL0.

In step ST33, calculator 32 acquires 3D coordinates (x, y, z) of one pixel in region R2 of load 5. Specifically, calculator 32 acquires the 3D coordinates (x, y, z) of the one pixel in region R2 of load 5 based on the fourth coordinate information indicating the 3D coordinate information of region R2 of load 5.

In step ST34, calculator 32 calculates protruding lengths L1 based on the calculation equation f (x, y, z) of protruding lengths L1 and the 3D coordinates (x, y, z) of the one pixel in region R2 of load 5.

In step ST35, calculator 32 determines whether or not protruding length L1 calculated is larger than maximum protruding length Lmax. Maximum protruding length Lmax is stored in storage 20. Note that, in first calculation of protruding lengths L1, maximum protruding length Lmax is "0", since maximum protruding length Lmax is initialized in step ST31.

In step ST35, in a case where protruding lengths L1 calculated are larger than maximum protruding length Lmax (Yes in step ST35), the process proceeds to step ST36. In a case where protruding lengths L1 calculated are equal to or less than maximum protruding length Lmax (No in step ST35), the process proceeds to step ST37.

In step ST36, calculator 32 sets protruding lengths L1 calculated to maximum protruding length Lmax.

In step ST37, calculator 32 determines whether or not all the pixels in region R2 of the load have been processed. In step ST37, in a case where all the pixels in region R2 of the load have been processed (Yes in step ST37), the process ends. In a case where all the pixels in region R2 of the load have not been processed (No in step ST37), the process returns to step ST33.

The calculation process illustrated in FIG. 20 is an example, and the calculation process of maximum protruding length Lmax of load 5 is not limited thereto. For example, calculator 32 calculates protruding lengths L1 for all the pixels in region R2 of load 5, and stores protruding lengths L1 in the each pixel in storage 20. Then, after the calculation of protruding lengths L1 for all the pixels in region R2 of load 5 is completed, calculator 32 may detect a largest value among protruding lengths L1 calculated, and calculate the value as maximum protruding length Lmax.

Further, when target 6 is captured by imager 10, another load that is not placed on pallet 2 may be captured, and a load that is not a target to be measured for protruding lengths L1 may be captured in image data 11. In this case, image processing unit 31 may also extract the load that is not the target to be measured as region R2 of load 5. In order to avoid the case, calculator 32 may perform a process of specifying region R2 of load 5 being placed on pallet 2.

Calculator 32 may calculate 3D coordinates of two opposing planes in standard load form 4 based on the 3D coordinate information of first plane PL1 and standard load form structure information 23. Calculator 32 may calculate a region sandwiched between the two opposing planes from the 3D coordinates of the two opposing planes, and calculate protruding lengths L1 of load 5 in the region sandwiched between the two opposing planes.

As an example, a case where the load that is not the target to be measured captured behind target 6 in image data 11 captured by imager 10 will be described. In this case, calculator 32 acquires the third coordinate information including the 3D coordinates of first plane PL1 and a second plane facing each other in standard load form 4. Further, calculator 32 calculates a region sandwiched between first plane PL1 and the second plane from the 3D coordinates of first plane PL1 and the second plane, and calculates protruding lengths L1 of load 5 in the region sandwiched between first plane PL1 and the second plane. Specifically, calculator 32 calculates the plane equation for first plane PL1 of standard load form 4 and a plane equation for the second plane facing first plane PL1. The plane equation for first plane PL1 may be acquired by a method as in step ST21 illustrated in FIG. 16. The plane equation for second plane PL2 may be calculated based on the plane equation for first plane PL1 and standard load form structure information 23. Calculator 32 calculates the region sandwiched between first plane PL1 and the second plane based on the plane equation for first plane PL1 and the plane equation for the second plane, and calculates protruding lengths L1 of load 5 present in the region. Accordingly, it is possible to measure protruding lengths L1 of load 5 excluding another load that is not the target to be measured and located on a side deeper than the second plane.

As another example, a case where the loads on two pallets 2 stacked in an up-down direction captured in image data 11 captured by imager 10 will be described. In this case, calculator 32 acquires the third coordinate information including 3D coordinates of a top surface and a bottom surface facing each other in standard load form 4. Further, calculator 32 calculates a region sandwiched between the top surface and the bottom surface from the 3D coordinates of the top surface and the bottom surface, and calculates protruding lengths L1 of load 5 in the region sandwiched between the top surface and the bottom surface. Specifically, calculator 32 calculates a plane equation for the upper surface of standard load form 4 and a plane equation for the bottom surface facing the upper surface. The plane equation for the upper surface and the plane equation for the bottom surface of standard load form 4 may be calculated based on the plane equation for first plane PL1, reference point P5, line segment V1, and standard load form structure information 23. Calculator 32 calculates the region sandwiched between the top surface and the bottom surface based on the plane equation for the top surface and the plane equation for the bottom surface, and calculates protruding lengths L1 of load 5 present in the region. Accordingly, it is possible to measure protruding lengths L1 of load 5 excluding a load on another pallet stacked above pallet 2.

As another example, a case where another load that is not the target to be measured is captured in a protruding direction of load 5 in image data 11 captured by imager 10 will be described. In this case, calculator 32 processes a continuous portion in load 5 that is protruding from pallet 2 as region R2 of load 5. Specifically, calculator 32 specifies protruding region R3 of load 5 continuous from protruding plane PL0 as the reference for the protruding of load 5 in standard load form 4, and calculates protruding lengths L1 of load 5 present in the region. Accordingly, it is possible to measure protruding lengths L1 of load 5 excluding another load being arranged in the protruding direction of load 5.

Effects

Measurement device 1 according to the first exemplary embodiment can achieve effects below.

Measurement device 1 according to the first exemplary embodiment of the present disclosure includes imager 10, image processing unit 31, and calculator 32. Imager 10 captures target 6 including pallet 2 having reference targets 3 and load 5. Image processing unit 31 extracts specific regions R1 in reference targets 3 and region R2 of load 5 based on image data 11 of target 6 captured by imager 10. Calculator 32 acquires first coordinate information 12 indicating the 3D coordinates associated with image data 11 and standard load form structure information 23 indicating the structural dimensions of standard load form 4 of pallet 2 associated with the coordinates of specific regions R1. Further, calculator 32 calculates protruding lengths L1 of load 5 protruding from pallet 2 based on specific regions R1, region R2 of load 5, first coordinate information 12, and standard load form structure information 23. Image processing unit 31 acquires the output data obtained by inputting, as the input data, image data 11 of target 6 captured by imager 10 to first machine learning model 21 to extract specific regions R1 in reference targets 3. In first machine learning model 21, the machine learning model is trained by using, as the training data, the image data of pallet 2 having reference targets 3 and the data indicating specific regions R1 in reference targets 3.

With such configuration, protruding lengths L1 of load 5 protruding from pallet 2 can be measured. Further, in measurement device 1, a user can easily measure protruding lengths L1 of load 5 by imaging target 6 including pallet 2 having reference targets 3 and load 5 by imager 10. Accordingly, it is possible to improve efficiency of a measurement operation for protruding lengths L1 of load 5.

First machine learning model 21 is the Key Point Detection using the Mask R-CNN. With such configuration, specific regions R1 in reference targets 3 can be extracted with high accuracy.

The each of reference targets 3 has a plurality of vertexes P1 to P4 defining respective specific regions R1. First machine learning model 21 detects the plurality of vertexes P1 to P4 in image data 11. With such configuration, specific regions R1 in reference targets 3 can be extracted with higher accuracy.

The each of reference targets 3 has the at least one reference plane 3a. Image processing unit 31 extracts specific regions R1 based on the at least one reference plane 3a. With such configuration, specific regions R1 in reference targets 3 can be extracted with higher accuracy.

The at least one reference plane 3a includes the plurality of reference planes, and the plurality of reference planes 3a are arranged apart from each other on the same plane. With such a configuration, since it is possible to suppress the error in the 3D coordinate acquisition and the influence due to the noises, and it is possible to extract specific regions R1 in reference targets 3 with higher accuracy.

Pallet 2 has bottom plate 2a and the plurality of struts 2b disposed on bottom plate 2a. Reference targets 3 are at least one strut among the plurality of struts 2b. With such configuration, protruding lengths L1 of load 5 can be measured more easily.

The plurality of struts 2b are arranged along the outer edge of bottom plate 2a. The at least one strut 2b has the plane as reference plane 3a on the outer edge side of bottom plate 2a. Image processing unit 31 extracts specific regions R1 based on the plane. With such configuration, specific regions R1 can be extracted with higher accuracy based on reference planes 3a, and protruding lengths L1 of load 5 can be measured more easily.

Image processing unit 31 acquires the output data obtained by inputting, as the input data, image data 11 of target 6 to second machine learning model 22 to extract region R2 of load 5. In second machine learning model 22, the machine learning model is trained by using, as the training data, the image data of load 5 placed on pallet 2 and the data indicating region R2 of load 5. With such configuration, region R2 of load 5 can be extracted with high accuracy.

Second machine learning model 22 is the Instance Segmentation using the Mask R-CNN model. With such configuration, region R2 of load 5 can be extracted with higher accuracy.

Imager 10 acquires image data 11 of target 6 and first coordinate information 12 by capturing target 6. With such configuration, image data 11 and first coordinate information 12 can be easily acquired. Further, in calculator 32, processes such as a coordinate transformation process can be omitted.

Calculator 32 acquires the second coordinate information indicating the 3D coordinates of specific regions R1 based on specific regions R1 and first coordinate information 12. Calculator 32 acquires the third coordinate information indicating the 3D coordinates of the standard load form to be defined by specific regions R1 based on the second coordinate information and standard load form structure information 23. Calculator 32 acquires the fourth coordinate information indicating the 3D coordinates of region R2 of load 5 based on region R2 of load 5 and first coordinate information 12. Calculator 32 calculates protruding lengths L1 of load 5 based on the third coordinate information and the fourth coordinate information. With such configuration, protruding lengths L1 of load 5 can be measured with high accuracy while specific regions R1 and region R2 of load 5 are being extracted with high accuracy.

Calculator 32 acquires the third coordinate information also including at least the plane equation for protruding plane PL0 as the reference for the protruding of load 5 in standard load form 4. Calculator 32 calculates protruding lengths L1 of load 5 based on the plane equation for protruding plane PL0 and the fourth coordinate information. With such configuration, protruding lengths L1 of load 5 can be measured with higher accuracy while specific regions R1 and region R2 of load 5 are being extracted with higher accuracy.

Calculator 32 calculates the plane equation for first plane PL1 of standard load form 4 on the side where reference targets 3 including the plurality of specific regions R1 are arranged based on the second coordinate information. Calculator 32 calculates the plurality of reference points P5 and P6 in specific regions R1 and the vector to be calculated from the plurality of reference points P5 and P6 based on the second coordinate information. Calculator 32 calculates the plane equation for protruding plane PL0 based on the plane equation for first plane PL1, reference point P5, the vector, and standard load form structure information 23. With such configuration, protruding lengths L1 of load 5 can be measured with higher accuracy.

Calculator 32 acquires the third coordinate information including the 3D coordinates of the two planes facing each other in standard load form 4, calculates the region sandwiched between the two planes from the 3D coordinates of the two planes, and calculates protruding lengths L1 of load 5 in the region sandwiched between the two planes. With such configuration, it is possible to measure protruding lengths L1 of load 5 excluding another load that is not placed on pallet 2, that is, is not the target to be measured.

Calculator 32 processes, as region R2 of load 5, a region continuous from the region of standard load form 4 in the load that is protruding from pallet 2. With such configuration, it is possible to measure protruding lengths L1 of load 5 excluding the another load that is not placed on pallet 2, that is, is not the target to be measured.

Calculator 32 calculates the largest value (maximum protruding length Lmax) among protruding lengths L1 of load 5. With such configuration, it is possible to acquire information of maximum protruding length Lmax of a most protruding portion from pallet 2 in load 5.

Measurement device 1 further includes outputter 40 that outputs protruding lengths L1. With such configuration, the user can easily know protruding lengths L1.

The same effects are achieved as the effects of measurement device 1 described above even in the measurement method according to the first exemplary embodiment of the present disclosure.

Note that, in the first exemplary embodiment, an example where imager 10 acquires image data 11 and first coordinate information 12 being the 3D coordinate information associated with image data 11 by capturing target 6 including pallet 2 and load has been described, but the present invention is not limited thereto. For example, imager may not acquire first coordinate information 12. In this case, calculator 32 may acquire the 3D coordinates corresponding to image data 11 by the coordinate transformation process.

In the first exemplary embodiment, an example where storage 20 stores first machine learning model 21, second machine learning model 22, and standard load form structure information 23 has been described, but the present invention is not limited thereto. For example, first machine learning model 21, second machine learning model 22, and standard load form structure information 23 may be stored in a server on a network. In this case, measurement device 1 may include a communication unit that communicates with the server, and first machine learning model 21, second machine learning model 22, and standard load form structure information 23 may be acquired from the server by the communication unit. Communication unit includes a circuit that communicates with an external device in accordance with a predetermined communication standard. The predetermined communication standard includes, for example, LAN, Wi-Fi (registered trademark), Bluetooth (registered trademark), USB, HDMI (registered trademark), a controller area network (CAN), and a serial peripheral interface (SPI).

In the first exemplary embodiment, an example of measurement device 1 has been described, but the present invention is not limited thereto. For example, the present disclosure may include an aspect of a measurement system or a server including the measurement device and the server. For example, the measurement system may include measurement device 1 including imager 10, calculator 32, outputter 40, and the communication unit, and a server including storage 20, image processing unit 31, and the communication unit. In the measurement system, the measurement device may execute the processes of steps ST1 and ST4 to ST6, and the server may execute the processes of steps ST2 and ST3. Note that, configuration of the measurement system is not limited thereto. For example, in the measurement system, storage 20, image processing unit 31, calculator 32, and outputter 40 may be included in the measurement device or may be included in the server. Further, in the measurement system, measurement device 1 and the server may include a storage that stores at least one element among elements to be stored in storage 20, respectively. For example, first machine learning model 21, second machine learning model 22, and standard load form structure information 23 may be stored in the storage of the measurement device, or may be stored in the storage of the server. Further, a subject executing the processes of steps ST1 to ST6 is not limited to the examples described above. The processes of steps ST2 to ST6 may be executed by the measurement device or may be executed by the server. Further, the measurement system may include a device other than the measurement device and the server.

In the first exemplary embodiment, an example where image processing unit 31 and calculator 32 are separate elements in controller 30 has been described, but the present invention is not limited thereto. For example, image processing unit 31 and calculator 32 may be integrally formed as one element. Alternatively, image processing unit 31 and calculator 32 may be divided into a plurality of elements, respectively. For example, image processing unit 31 may be divided into a first image processing unit that extracts specific regions R1 and a second image processing unit that extracts the region of load 5. Calculator 32 may be divided into a first calculator that acquires the first coordinate information to the fourth coordinate information and a second calculator that calculates protruding lengths L1 of load 5.

In the first exemplary embodiment, an example where reference targets 3 are the plurality of struts 2b has been described, but the present invention is not limited thereto. Reference targets 3 may be any target as a reference for extracting specific regions R1 on pallet 2.

In the first exemplary embodiment, an example where image processing unit 31 extracts region R2 of load 5 by using second machine learning model 22 has been described, but the present invention is not limited thereto. For example, image processing unit 31 may extract region R2 of load 5 based on input information from the user. In this case, measurement device 1 may include an input unit that receives the input information from the user. The input unit may be, for example, an input interface such as a touch panel. In this way, measurement device 1 may calculate protruding lengths L1 of load 5 based on the information of region R2 of load 5 input by the user.

In the first exemplary embodiment, an example where calculator 32 calculates protruding lengths L1 has been described, but the present invention is not limited thereto. For example, calculator 32 may calculate a protruding width and a protruding height of load 5.

In the first exemplary embodiment, an example where outputter 40 outputs maximum protruding length Lmax has been described, but the present invention is not limited thereto. For example, outputter 40 may output protruding lengths L1 of a specific position. In this case, measurement device 1 may include an input unit that receives the input information from the user. Measurement device 1 may output protruding lengths L1 of load 5 corresponding to the position based on information of a position in region R2 of load 5 input by the user.

In the first exemplary embodiment, an example where the third coordinate information is the information of the 3D coordinates of protruding plane PL0 has been described, but the present invention is not limited thereto. The third coordinate information may include at least the 3D coordinate information of protruding plane PL0. The third coordinate information may include 3D coordinate information of a plane constituting standard load form 4 in addition to protruding plane PL0. For example, the third coordinate information may include the 3D coordinate information of all the six planes of standard load form 4, or may include 3D coordinates of a plurality of planes among the six planes of standard load form 4.

In the first exemplary embodiment, an example where the right plane of standard load form 4 is determined in advance as protruding plane PL0 has been described, but the present invention is not limited thereto. As for protruding plane PL0, at least one surface among the six surfaces of standard load form 4 may be determined in advance as protruding plane PL0. For example, the two planes of the right plane and the left plane of standard load form 4 may be determined in advance as protruding plane PL0.

Alternatively, an upper plane of standard load form 4 may be determined in advance as protruding plane PL0.

In the first exemplary embodiment, an example where protruding plane PL0 is determined in advance has been described, but the present invention is not limited thereto. For example, protruding plane PL0 may be determined based on the fourth coordinate information. For example, calculator 32 may estimate a protruding direction of load 5 based on the fourth coordinate information, and determine a plane in the protruding direction of load 5 as protruding plane PL0. In this case, the third coordinate information may include the 3D coordinate information of all the six planes of standard load form 4, or may include the 3D coordinate information of two or more planes among the six planes of standard load form 4. Calculator 32 may estimate the protruding direction estimated based on the fourth coordinate information, and determine a plane located in the protruding direction among the planes of standard load form 4 as protruding plane PL0.

In the first exemplary embodiment, an example where standard load form 4 is a rectangular parallelepiped having six planes has been described, but the present invention is not limited thereto. For example, standard load form 4 may be in a shape such as a quadrangular pyramid.

In the first exemplary embodiment, an example of calculating the plane equation for protruding plane PL0 as the third coordinate information has been described, but the present invention is not limited thereto. The third coordinate information only needs to include the information of the 3D coordinates of protruding plane PL0, and is not limited to the plane equation.

Although the present disclosure has been fully described in connection with preferable exemplary embodiments with reference to the accompanying drawings, various variations and modifications are obvious to a person skilled in the art. It should be understood that, as long as such variations and modifications do not deviate from the scope of the present invention according to claims appended, such variations and modifications are included therein.

The measurement device and the measurement method of the present disclosure can easily measure protruding lengths of loads protruding from pallets, and thus are suitable for a transportation field such as stacking of the loads on a truck or in a warehouse.

What is claimed is:

1. A measurement device comprising:
   an imager that captures a target including a pallet and a load, the pallet including a reference target;
   an image processing unit that extracts a specific region in the reference target and a region of the load based on image data of the target captured by the imager; and
   a calculator that acquires first coordinate information indicating 3D coordinates associated with the image data and standard load form structure information indicating a structural dimension of a standard load form of the pallet associated with coordinates of the specific region, and calculates protruding lengths of the load protruding from the pallet based on the specific region, the region of the load, the first coordinate information, and the standard load form structure information,
   wherein
   the image processing unit acquires output data obtained by inputting, as input data, the image data of the target captured by the imager to a first machine learning model subjected to training by using, as training data, image data of the pallet having the reference target and data indicating the specific region in the reference target, to extract the specific region in the reference target.

2. The measurement device according to claim 1, wherein
   the reference target has a plurality of vertexes defining the specific region; and
   the first machine learning model detects the plurality of vertexes in the image data.

3. The measurement device according to claim 2, wherein
   the first machine learning model is Key Point Detection using Mask R-CNN.

4. The measurement device according to claim 1, wherein
   the reference target has at least one reference plane; and
   the image processing unit extracts the specific region based on the at least one reference plane.

5. The measurement device according to claim 4, wherein
   the at least one reference plane is a plurality of reference planes; and
   the plurality of reference planes are arranged apart from each other on a same plane.

6. The measurement device according to claim 1, wherein
   the pallet includes a bottom plate and a plurality of struts disposed on the bottom plate; and
   the reference target is at least one strut among the plurality of struts.

7. The measurement device according to claim 6, wherein
   the plurality of struts are arranged along an outer edge of the bottom plate;
   the at least one strut has a plane as the reference plane on an outer edge side of the bottom plate; and
   the image processing unit extracts the specific region based on the plane.

8. The measurement device according to claim 1, wherein
   the image processing unit acquires output data obtained by inputting, as the input data, the image data of the target to a second machine learning model subjected to training by using, as training data, image data of the load placed on the pallet and data indicating the region of the load, to extract the region of the load.

9. The measurement device according to claim 8, wherein
   the second machine learning model is Instance Segmentation using a Mask R-CNN model.

10. The measurement device according to claim 1, wherein
    the imager acquires the image data of the target and the first coordinate information by capturing the target.

11. The measurement device according to claim 1, wherein
    the calculator
    acquires second coordinate information indicating 3D coordinates of the specific region based on the specific region and the first coordinate information;
    acquires third coordinate information indicating 3D coordinates of the standard load form to be defined by the specific region based on the second coordinate information and the standard load form structure information;
    acquires fourth coordinate information indicating 3D coordinates of the region of the load based on the region of the load and the first coordinate information; and
    calculates the protruding lengths of the load based on the third coordinate information and the fourth coordinate information.

12. The measurement device according to claim 11, wherein
    the calculator
    acquires the third coordinate information including at least a plane equation for a protruding plane as a reference for protruding of the load in the standard load form; and
    calculates the protruding lengths of the load based on the plane equation for the protruding plane and the fourth coordinate information.

13. The measurement device according to claim 12, wherein
    the calculator
    calculates a plane equation for a first plane of the standard load form on a side where the reference target including the specific region is arranged based on the second coordinate information;
    calculates a plurality of reference points in the specific region and a vector to be calculated from the plurality of reference points based on the second coordinate information; and
    calculates the plane equation for the protruding plane based on the plane equation for the first plane, at least one reference point among the plurality of reference points, the vector, and the standard load form structure information.

14. The measurement device according to claim 13, wherein the calculator
acquires the third coordinate information including 3D coordinates of two planes facing each other in the standard load form;
calculates a region sandwiched between the two planes from the 3D coordinates of the two planes; and
calculates the protruding lengths of the load in the region sandwiched between the two planes.

15. The measurement device according to claim 1, wherein
the calculator processes, as the region of the load, a region where the load is continuously present from a region of the standard load form in the load that is protruding from the pallet.

16. The measurement device according to claim 1, wherein
the calculator calculates a maximum protruding length among the protruding lengths of the load.

17. The measurement device according to claim 1, further comprising an outputter that outputs the protruding lengths.

18. A measurement method comprising:
capturing a target including a pallet and a load, the pallet including a reference target;
extracting a specific region in the reference target based on image data of the target captured;
extracting a region of the load based on the image data of the target captured;
acquiring first coordinate information indicating 3D coordinates associated with the image data and standard load form structure information indicating a structural dimension of a standard load form of the pallet associated with coordinates of the specific region; and
calculating protruding lengths of the load protruding from the pallet based on the specific region, the region of the load, the first coordinate information, and the standard load form structure information,
wherein
extracting the specific region in the reference target includes acquiring output data obtained by inputting, as input data, the image data of the target captured to a first machine learning model subjected to training by using, as training data, image data of the pallet having the reference target and data indicating the specific region in the reference target, to extract the specific region in the reference target.

19. A non-transitory computer-recording medium recording a program for causing a computer to execute the method according to claim 18.

* * * * *